(12) United States Patent  (10) Patent No.: US 6,684,193 B1
Chavez et al.  (45) Date of Patent: Jan. 27, 2004

(54) METHOD AND APPARATUS FOR MULTIVARIATE ALLOCATION OF RESOURCES

(75) Inventors: Thomas A. Chavez, San Francisco, CA (US); Paul Dagum, Menlo Park, CA (US)

(73) Assignee: Rapt Technologies Corporation, San Francisco, CA (US)

( * ) Notice: Subject to any disclaimer, the term of this patent is extended or adjusted under 35 U.S.C. 154(b) by 0 days.

(21) Appl. No.: 09/412,560

(22) Filed: Oct. 5, 1999

(51) Int. Cl.[7] .............................................. G06F 17/60
(52) U.S. Cl. .............................................. 705/8; 705/7
(58) Field of Search ............................. 705/8, 7; 703/2, 703/6; 700/28

(56) References Cited

U.S. PATENT DOCUMENTS

| | | | | | |
|---|---|---|---|---|---|
| 4,744,026 | A | * | 5/1988 | Vanderbei ........................ | 705/8 |
| 4,744,027 | A | * | 5/1988 | Bayer et al. .................... | 705/7 |
| 4,744,028 | A | * | 5/1988 | Karmarkar ...................... | 705/8 |
| 4,894,773 | A | * | 1/1990 | Lagarias ......................... | 705/7 |
| 4,914,563 | A | * | 4/1990 | Karmarkar et al. ............ | 700/28 |
| 4,924,386 | A | * | 5/1990 | Freedman et al. ............. | 705/8 |
| 5,185,715 | A | * | 2/1993 | Zikan et al. ................ | 708/801 |
| 5,630,070 | A | * | 5/1997 | Dietrich et al. ................ | 705/8 |
| 5,970,465 | A | * | 10/1999 | Dietrich et al. ................ | 705/7 |
| 6,138,103 | A | * | 10/2000 | Cheng et al. ................... | 705/7 |

FOREIGN PATENT DOCUMENTS

| | | | | |
|---|---|---|---|---|
| DE | 0 356 191 A2 | * | 2/1999 | ........... G06F/15/20 |

OTHER PUBLICATIONS

Hillier et al., "Introduction to Operations Research", McGraw–Hill, Inc., 1995, 6th Edition, pp. 26–28, 38–43, 82–90, 134, 153–158, 164–174, 558–562, and 568.*

Edirisinghe, Nalin Chanaka Perera, "Essays on Bounding Stochastic programming problems", Disertation Abstracts Internation, 1991 [retrieved 10/10/02], vol.53/12–B, p.6379, 1 page, Retrieved from: Dialog.*

Dintersmith, Ted, "A seperating Choice Hyperplane algorithm for evaluating multiattribute decisions", Operations Research, Nov./Dec. 1984 [retrieved on 10/10/02], vol.32, No. 6, p 1328, 1 page, Retrieved from: Dialog.*

Dagum et al., "Time series prediction using belief network models", International Journal of Human–Computer Studies, Jun. 1995 [retrieved 04/07/03], vol. 42, 1 page, retrieved from: Dialog, file 99.*

Dagum et al., "Polytopes, permanents, and graphs with large factors", IEEE, 1988 [retriebed 04/07/03], 1 page, retrieved from: Dialog, file 2.*

(List continued on next page.)

*Primary Examiner*—Tariq R. Hafiz
*Assistant Examiner*—Beth Van Doren
(74) *Attorney, Agent, or Firm*—Campbell Stephenson Ascolese LLP; Samuel G. Campbell, III

(57) ABSTRACT

A method and apparatus providing for an efficient solution to the multivariate allocation of resources are described. A model is formulated that derives the relationship between a set of resources and a set of refinements, wherein any of a number of resources are used to build or comprise a refinement. The model provides for at least: the resource consumption as based upon the relationship between each refinement and its set of supporting resources, a demand distribution of the refinements, and a value function. Each resource, and the refinements that it supports, generates a resource hyperplane in a demand space, and the complete set of refinements generates an intersecting set of hyperplanes forming a polytope on which resource allocation fulfills refinement demand. An expected value function is thereafter formulated and transformed into a closed form solution.

26 Claims, 14 Drawing Sheets

OTHER PUBLICATIONS

Alanyali, Murat, "Analysis of some simple policies for dynamic resource allocation", Dissertation Abstracts International, 1996 [retrieved 04/07/03], vol. 57/10–B, 1 page, retrieved from: Dialog, file 35.*

Manugistics, Inc., "Statgraphics plus", www.statgraphics.com, Dec. 1998 [retrieved 04/03/03], 13 pages, retrieved from: archive.org and google.com.*

Van Roy, Benjamin, "Learning and Value Function Approximation in complex decision processes", Dissertation Abstracts International, 1998 [retrieved 04/07/03], vol.59/10–B, pages1–2, retrieved from: Dialog, file 35.*

* cited by examiner

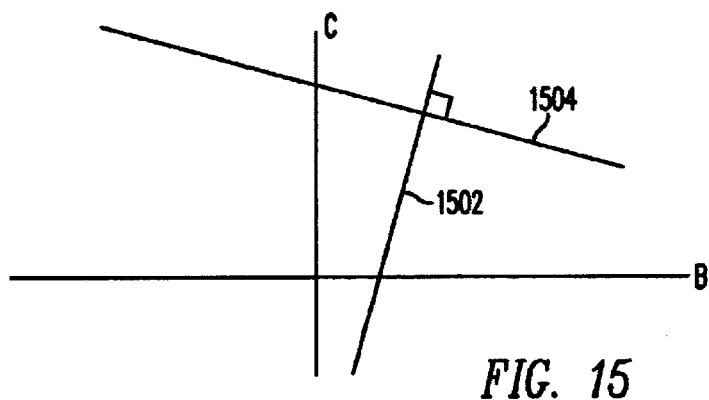
FIG. 15
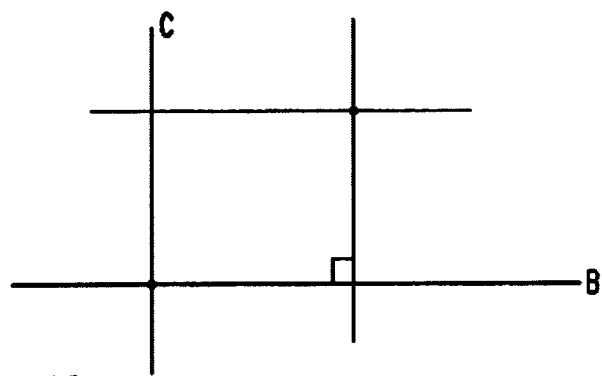
FIG. 16
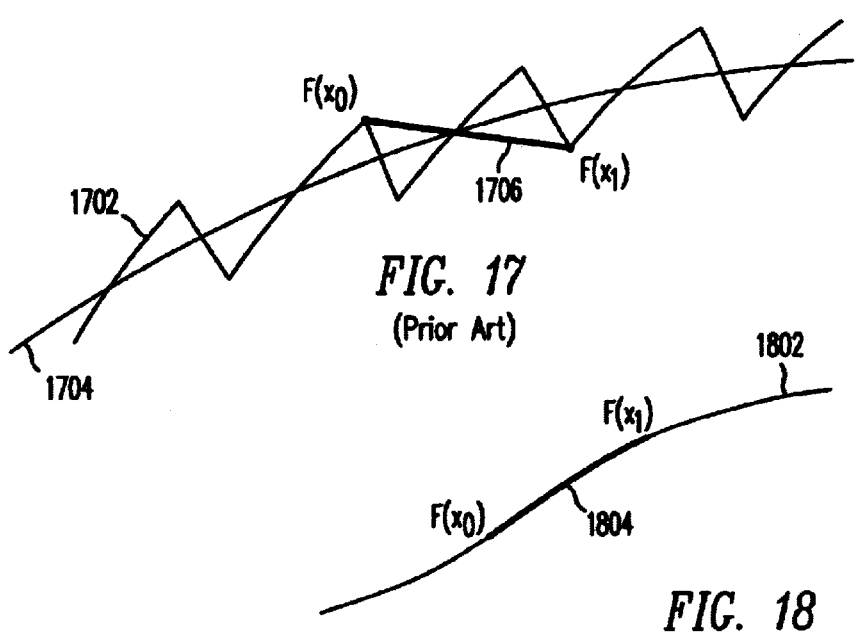
FIG. 17
(Prior Art)
FIG. 18

METHOD AND APPARATUS FOR MULTIVARIATE ALLOCATION OF RESOURCES

FIELD OF THE INVENTION

The present invention relates generally to a method and apparatus for the multivariate allocation of resources. In particular, the present invention provides a method and apparatus for modeling objects, such as customers and suppliers, and thereafter presents a method for solving a resulting multivariate expected value function as a closed form expression.

BACKGROUND OF THE INVENTION

According to microeconomic theory, a recurring problem of large scale manufacturing processes is the allocation of valuable resources to meet uncertain consumer demand over a large number of products. In the most general scenario, certain resources are shared among many products. As a result, depletion of any one resource by a product demanding a high amount of that resource will preclude the manufacture of all other products requiring that same resource for manufacture.

A simple solution to this problem would be to maintain a large inventory of all relevant resources. This, however, is not an effective solution because resource inventory accrues a cost to the company. Some fast moving, or volatile inventory materials might decrease in value at an exponential rate. Certain types of memory components, for example, are known to depreciate at a rate of approximately one percent per week. If significant inventories are maintained for a long period of time, then such components will lose most their value before being used. Sometimes such components can even become valueless. This adds unnecessary costs to the manufacture of the product, and ultimately the price offered to the consumer. If such costs cannot be passed onto the consumer, as is typical in competitive markets, then such costs will come directly out of a company's profits.

A converse solution would be to maintain low inventories, and then procure the parts from the suppliers on an as-needed basis. This is not an effective solution because procuring scarce parts on a short-term basis often carries added costs, or "penalty costs." For instance, parts that are ordered during the normal course of business carry a certain cost. Parts that are required on an expedited basis are often priced at higher levels. These costs are usually ratcheted upwards (on a lock-step basis, or otherwise) as the demand for product increases. Hence, if a significant number of parts are needed to complete the manufacture of a series of products, then a significant premium will have to be paid to the suppliers in order to procure sufficient parts. As a worst case, such scarce parts might not be available at any price. If the parts cannot be procured, then the end products cannot be manufactured. This will obviously result in lost sales. Significant lost sales can even lead to overall lost market share and reduced customer loyalty.

Accordingly, the general solution to such problems involves finding the allocation of components (or resources) that maximizes value (i.e. profits, or revenues minus costs) across the set of products (or refinements) to be manufactured. More importantly, the solution must take into account the "horizontal" interaction effects among products, as well as the "vertical" consumption effects between products and components.

Simple prior art solutions to allocation problems include Manufacturing Requirements Primer (MRP) models. The basic principle behind an MRP model is to formulate a "recipe" pertaining to the manufacture of a product, i.e. one microprocessor, two memory modules, and one storage device might be used to make up an end product. An MRP model performs a count of such components and tallies them up across the number (and type) of desired end products. Thereafter the MRP system schedules the allocation and delivery of such components at the factory so that the manufactured products come out on time, and in the proper order. However, such MRP models and solutions do not adequately account for the interactive effects among products and components. Moreover problematic, MRP models and solutions typically assume fixed, known demands on products.

Other prior solutions have been proposed which partially address the horizontal interaction effects and the vertical consumption effects, with the result being an expected value function which must be solved for a given value. The expected value function is generally the expectation of a linear, or polynomial, or exponential function over a multivariate normal (or other type) distribution. The more interactions that occur between the various components of a model, the higher the order of the expected value function. For any model involving a plurality of interactions, the form of this expression usually becomes a very complicated multivariate integral. To solve this function over a plurality of variables, prior solutions must employ significant computer resources. Often the best approach in solving such integrals involves applying a "Monte Carlo" technique, which in the end serves as only an approximation of a result. Monte Carlo techniques also takes massive amounts of computer processing power (i.e. a supercomputer) to solve, and cannot generally be solved in a reasonable period of time.

Given that the solution to such allocation problems often carries significant financial ramifications for a company, it is important to produce a solution which is more than just an estimate. Moreover, an expression is needed which can be solved in a reasonable amount of time, and without supercomputer resources. Hence, a modeling technique is needed that will properly account for the horizontal and vertical interactions between certain modeled elements. A solution technique is thereafter needed which will present a closed form expression of the resulting function, wherein it will not be necessary to solve multiple integrals in order to determine a solution. This closed formed expression should also be executable on ordinary computer resources, and in a reasonable period of time, despite the multivariate nature of the problem.

SUMMARY OF THE INVENTION

To achieve the foregoing, and in accordance with the purpose of the present invention, a method and apparatus are disclosed that provides an efficient solution for the multivariate allocation of resources.

The theory and solution generalizes to any model of resource consumption, in relation to producing a "refinement." The term "refinement," as used through this document, is generally intended to represent an end result (i.e. product) which might be produced from a set of resources (i.e. components, or the like). Therefore, a typical refinement-resource framework might involve product-component models, wherein certain components are used to comprise certain products. Resources might also include available liquid capital for investment, bonds, stocks, and options. The present system might also be used to consider assets, a portfolio of assets, or consumption of those assets, such as energy (e.g. gas, nuclear, electric), space, real estate, etc. Another example problem includes the allocation of manpower. For instance, in association with manpower problems, a set of resources (i.e. employees) exists that might be used by many different end sources (i.e. work tasks, or jobs). Sharing of such manpower will involve a complex mix of parameters. In order to maximize productivity (or revenue), the assets (or resources) will need to be analyzed, in relation to production (or refinement) goals.

As yet another example, a company might entertain a portfolio of development projects. Each project requires the allocation of capital, work force, and new equipment. Certain factors remain uncertain, including project growth as based upon the success of the venture, market indicators of the interest in the product, uncertain market pressures and demand, and the synergization and cannibalization offered by competing projects. The company desires to know how to best allocate its resources over the various projects in order to maximize revenues in the face of the aforementioned uncertainties.

According to one aspect of the present invention, relevant models and associated equations are formulated, wherein the equations are solved for certain values (or ranges). The models might consist of a set of resources (e.g. components) and a set of refinements of those resources (e.g. products). The resource consumption is based on a linear relationship between each refinement and its set of supporting resources (e.g. the bill of materials for a product). Each resource is typically shared among several refinements. There is a demand distribution for the refinements that is a multivariate normal distribution (e.g. future product demand for next quarter, or the like). There is also a value function that is a linear, polynomial, or exponential function of the refinement demands and other associated parameters of the model. For instance, the value function might include a revenue function for certain products, and be expressed as a sum of the products of the margin and demand for each refinement (or product). Of interest to any company, analyst, or the like, is the computation of the statistical expectation of the value, function at a given resource allocation, and for a given multivariate normally distributed demand profile. This is referred to as the expected value function.

According to another aspect of the present invention, this expected value function is transformed into a closed form expression. According to the solution offered by the present method and apparatus, each resource, and the refinements that it supports, generates a resource hyperplane in the demand space such that on one half of the hyperplane, the resource is in excess of the combined demand generated by the refinements. On the other half of the hyperplane, there is an insufficient amount of the resource to meet the combined refinement demand.

The complete set of refinements generates an intersecting set of hyperplanes in the demand space such that the joint intersection forms a polytope on which resource allocation fulfills refinement demand. However, because the resource is in excess, it generates a resource loss in the value function, also known as erosion. In the complement space of the polytope, there can be also be resource losses, i.e. certain components erode because they were not fully consumed, given the exhaustion of another key component. There can also be refinement losses in the form of refinement demands that were not fully met.

The particular form of the value function might also depend on certain policies (i.e. business, strategic, etc.) associated with allocating resources to the refinements. The expected value function might then be solved under various policies, including: a priority policy that fulfills refinement demands in some pre-specified rank order; and a uniform policy that uniformly meets refinement demands.

A sequence of three linear transformations are used to reduce the expected value function to a multivariate polynomial function of single variable integrals, wherein each such integral has a closed form expression. The expected value function can therefore be reduced to a closed-form expression that depends upon (among other things) the resource allocations, the coefficients of the linear combination of resources for each refinement, and the coefficients of the value function.

The first linear transformation uses a Cholesky decomposition of the covariance matrix and thereby reduces the mean and covariance matrix of the refinement multivariate demand distribution to a multivariate normal distribution that has mean zero and a covariance matrix that is the identity matrix. Given that this transformation is linear, the resource hyperplanes are transformed into new hyperplanes. This transformation has the property that the transformed hyperplanes are clustered into groups of hyperplanes that are approximately parallel.

The second linear transformation identifies a minimum orthogonal set of hyperplanes that spans the preceding transformed hyperplanes. The transformation uses factor analysis to identify this minimum spanning set.

The final transformation orthogonally rotates the minimum spanning set of hyperplanes so that they align along the coordinate axes. The linear, polynomial, or exponential value functions are transformed into similar functions after an orthogonal rotation of the coordinate axes. The multivariate normal distribution thus transformed has zero mean and identity covariance matrix, and is invariant to orthonormal rotational transformations. Hence, after the third transformation, the expected value function can be factored into a sum of products of univariate integrals, each with a closed form solution.

According to another aspect of the present invention, the solution is derivable when resource consumption follows a general rational model (e.g. the level of production refinement is proportional to the product of supporting resource allocations, wherein each item in the product enters with some positive or negative exponent).

Still another aspect provides for nonlinear elasticity in the value function. For instance, specific examples of terms in the value function (in a microeconomic model of product and component manufacture) might include product revenue. This term can be linear or nonlinear with coefficients that depend explicitly on product demand, the thereby reflect nonlinear elasticity.

Still another aspect provides that for a linear (also called general rational) resource consumption model, the refinement demand distribution can be inverted to yield a resource demand distribution that is also multivariate normal. From that inversion, an expectation value can be computed that depends explicitly on the resources. For example, the value function might include resource erosion (i.e. under-utilized resources at the end of a time period), or resource expediting (i.e. a need to expedite extra resources to fulfill refinement demand). Because refinement demand is uncertain—with probability distribution captured through a multivariate normal—resource demand is also uncertain with a probability distribution also captured through a multivariate normal that is obtained by effectively inverting the consumption model. Thus, the method for finding the expectation of the preceding resource based value function is directly applicable.

According to yet another aspect, the present invention can account for substitution of resources. Substitutability of resources in the production of a refinement suggests that certain resources can be substituted for other resources in the production model, but often with an incurred penalty, or cost. The solutions offered by the present invention apply directly to a general model of resource substitution with associated substitution costs.

Yet another aspect of the present invention provides for sensitivity analysis. The closed form solution of the expected value function—i.e. the expectation of the value function over the refinement demand distribution—can be used to perform sensitivity analysis on each parameter in the value function.

Still another aspect of the present invention provides for sensor elements to be strategically located along data flows. These sensors might have embedded (or associated therewith) a probabilistic model that dynamically changes with the flow or update of various data through the sensor. The refined (up-to-date) probabilities can then be applied to the formation of the expected value function, and the solution thereof according to the present invention.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which:

FIG. 15 shows a plot of a multidimensional transformation example (of the second transformation step), wherein the hyperplanes are rotated to be perpendicular to each other.

FIG. 16 shows a plot of a multidimensional transformation example (of the final transformation step), wherein the hyperplanes are rotated to be parallel to the axes.

FIG. 17 shows an example prior art attempt to find derivatives along a curve which has been approximated by a Monte Carlo technique.

FIG. 18 shows the result of calculating a derivative according to one aspect of the present invention.

DETAILED DESCRIPTION OF THE INVENTION

The present invention relates generally to a method and apparatus for the multivariate allocation of resources. In particular, the present invention provides a method and apparatus for modeling objects, such as customers and suppliers, and thereafter presents a method for solving a resulting multivariate expected value function as a closed form expression.

Formulation of Model

Figure 1A:
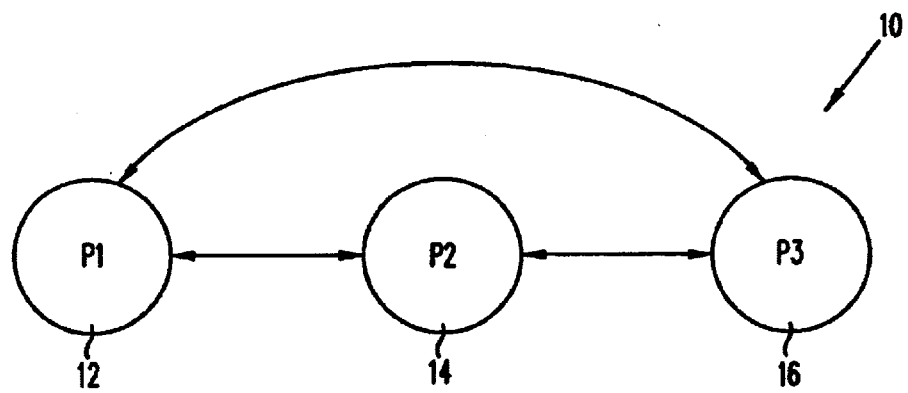
FIG. 1A illustrates a simple, single tiered influence diagram.
Figure 1B:
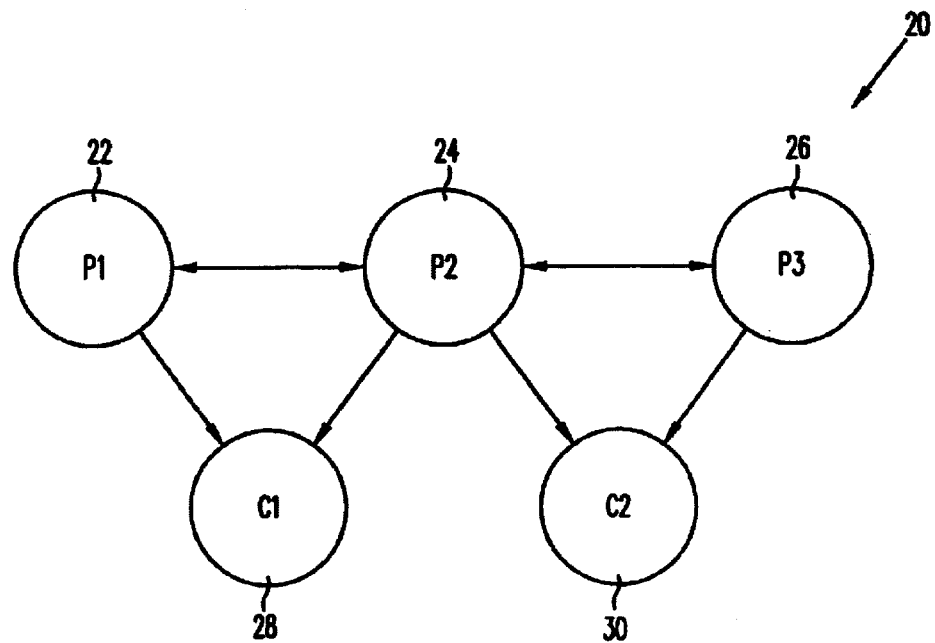
FIG. 1B illustrates a two-tiered influence diagram.

Referring now to FIG. 1A, a block diagram is shown of certain representative elements which illustrate a form of "influence diagram." Influence diagrams are useful in depicting the structural connections among a set of variables. Such diagrams are useful in structuring models for a variety of elements relating to the allocation of resources, and the like. FIG. 1A shows a very simple single-tiered model 10, wherein the "interactions" between products P1 (12), P2 (14), and P3 (16) are shown. Products are said to interact when knowledge of demand for one product affects the knowledge of demand for another product. Interaction thus allows for modeling phenomena such as "synergy" or "cannibalization" between two products (see below). As shown in the Figure, P1 interacts with P2, and P2 interacts with P3, and P1 interacts with P3. FIG. 1B shows a two-tiered example diagram 20. Products P1, P2, and P3 (22–26) are again shown interacting. Component C1 (28) is shown interacting with products P1 and P2. Similarly component C2 (30) is shown interacting with products P2 and P3.

Figure 2:
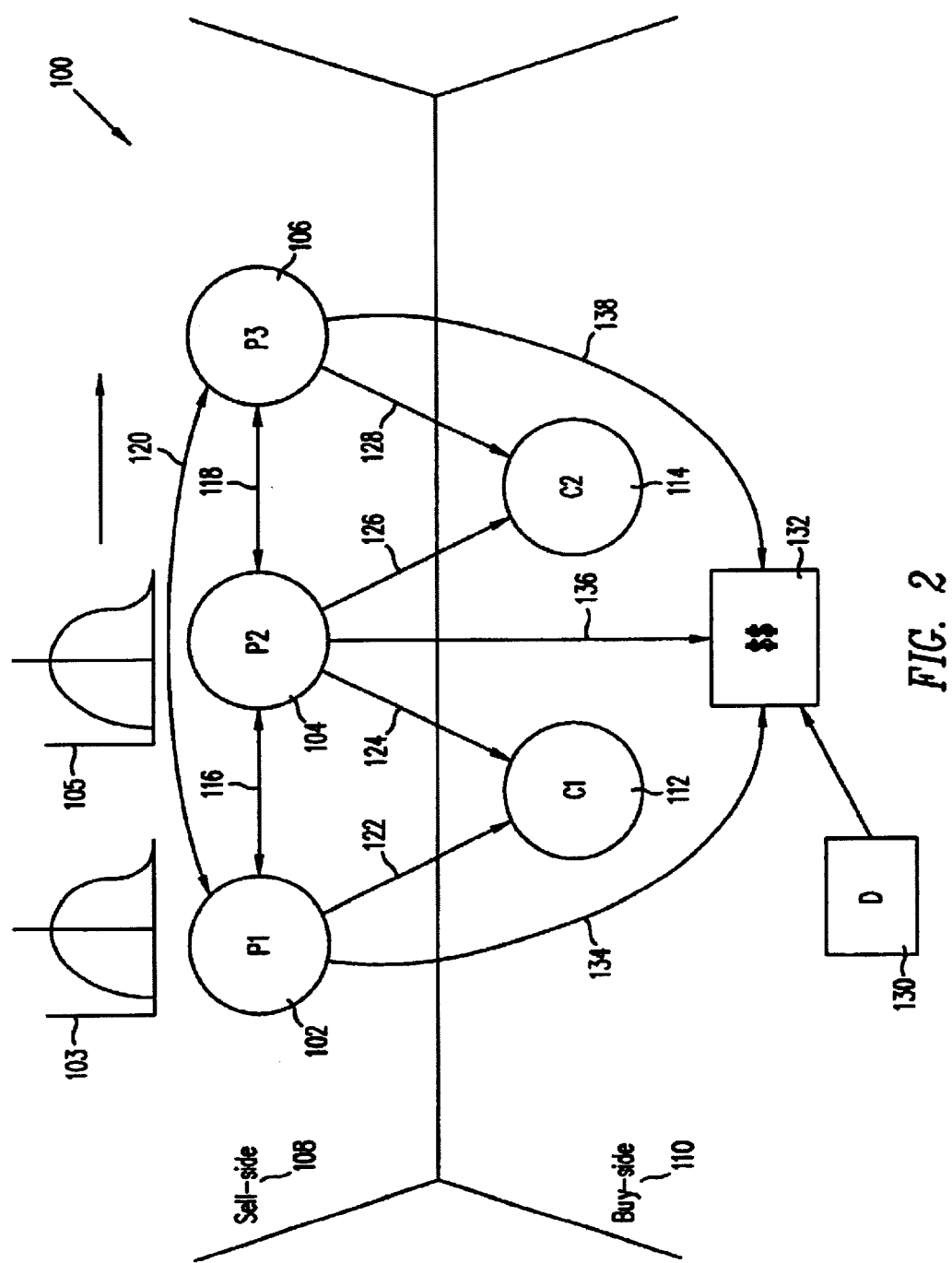
FIG. 2 illustrates a more complex influence diagram with multiple horizontal and vertical interactions between the elements.

Full scale models would be very complicated to illustrate. Referring now to FIG. 2, a more complex influence diagram 100 is shown—yet this diagram still represents a relatively simple economical model. The present invention intends that such a model can be scaled upwards (and outwards) to encompass any level of complexity. Along the top of the model a series of products are shown as P1 (102), P2 (104), and P3 (106). Along the bottom, a series of components are shown as C1 (112) and C2 (114). Products are generally offered for sale to customers, which express a demand for such products. The products, as offered by an enterprise company or the like, exist on the sell-side 108 of the model, and the components to form the products exist on the buy-side 110 of the model.

The interconnecting arcs and lines 116, 118, and 120 between the products are meant to represent the interacting effects that occur among these products as they are consumed by customers out in the market. For example, a company might be selling a desktop work station computer. Thereafter, the company might launch a work group server computer. There is a well known "cannibalizing" effect that frequently occurs between products of this nature. If the company would normally sell a certain number of desktop computers, then the introduction and sale of every work group server computer would likely result in fewer sales of desktop units. Alternatively, the interactive effect can enhance sales of a particular product. For instance, a company might be selling servers, and also selling memory modules. Often a customer will find it necessary to upgrade a server to include more memory, and hence the sale of a server will actually enhance further sales of memory modules.

The arcs 122 and 124 demonstrate the relationship between the component C1 and products P1 and P2, wherein both products utilize component C1. Arcs 126 and 128 similarly show the relationship between the component C2 and products P2 and P3, wherein both products utilize component C2. Value erosion effects, and the like, are part of the interaction effects which are recorded in the form of a joint probability distribution on the products. Each product will have a probability curve (e.g. 103, 105) associated with it. Consumption effects are captured along the arcs and describe the ways in which the products consume the required resources. Element 130 (labeled "D") represents the decisions about how to allocate components. For instance, "D" might be a function of the following decision: for given a particular allocation of components, can an available supply of products be provided up to a certain level. Decisions about allocations are going to provide a certain amount of revenue, represented as element 132. Links 134, 136, and 138 are provided from each of the products, which are sold to generate revenue, into element 132. This provides a model of volume, or a units-oriented model. Revenue is maximized by balancing the amount of money brought in (from sales of the products) against the costs of procuring the components (to manufacture the products).

This model shows a simple canonical example of a type of allocation problem to be solved. At deployment, this model must account for a multitude of products, and perhaps an even larger number of components. Characteristics and distinctions might need to be made between certain products, and certain components. Accordingly, each of the "nodes" in this model can be expanded—in a graphical format or otherwise—by selecting (i.e. double-clicking or the like) on a graphical depiction of any of the nodes.

Figure 3:
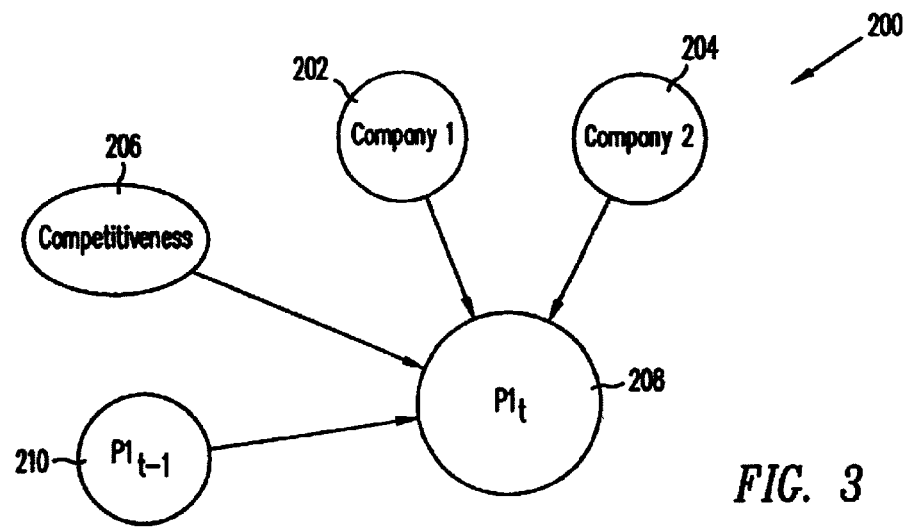
FIG. 3 illustrates an example of further detail which might be provided by a product node.

Referring now to FIG. 3, a representative expansion 200 of the product node P1 is shown. As such, an analysis of the total demand for P1 might be performed. The total demand for P1 is going to be a function of the individual demands of Company 1 (202), Company 2 (204), and so forth. The Competitiveness 206 of the product can also be factored in. For instance, a competitive product might have a high degree of cannibalization between the sale of Company 1 products and the sale of Company 2 products. Further shown is the concept of a historical time series, wherein P1 is shown at time "t" (208), and P1 is shown at time t−1 (210). Regardless of the expansion used, a demand probability distribution is assigned to each product. Standard, off-the-shelf algorithms can be used to estimate such an implied distribution, given a time series, and/or marketing science, or the like. Such distributions will not only be data driven, but also be knowledge driven. Any type of distribution might result from such modeling, including a Guassian distribution (most common), or a normal distribution, or others. A joint probability distribution on the products is used which imputes (or induces, or infers) a set of consumption distributions on the components. In light the relationships between the modeled elements, a consumption distribution can be determined (or inferred) from the components. The value model described above incorporates the revenue margin and costs associated with the given set of products, all of which takes into account the sharing effects between the modeled elements.

As extra layers of complexity are added, charting such models, and accounting for the interaction between the various elements becomes much more difficult. Simply applying the aforementioned "recipes" might provide a certain consumption distribution demand, but this demand might end up being higher than the number of products on hand for sale (i.e. the supply). Another problem then becomes how to apportion revenue—or how to measure the revenue contribution of one product over another, in light of the components used by each product. To be effective, the model must capture such factors as financial cost revenue management, risk management, and sharing effects. Not having enough supply to meet demand is a common business problem. For example, General Motors estimates that 20% of all car sales are missed because the right product is not in the right place (at the right time).

Figure 4A:
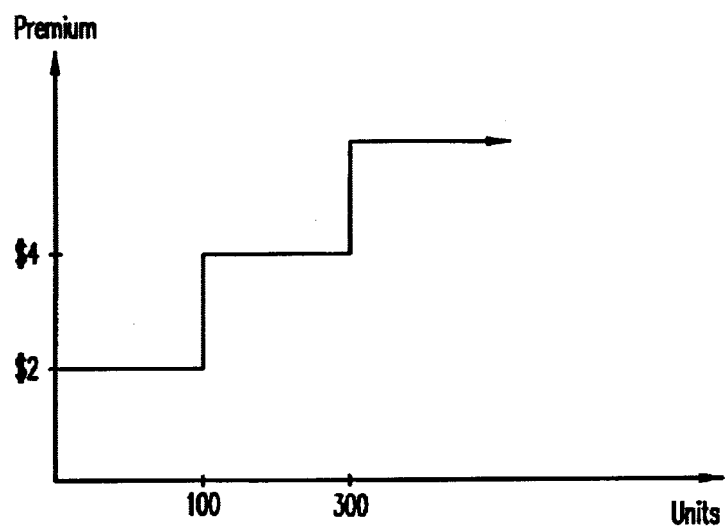
FIG. 4A illustrates a step function of escalating premium costs for more ordered units past a certain contract level.
Figure 4B:
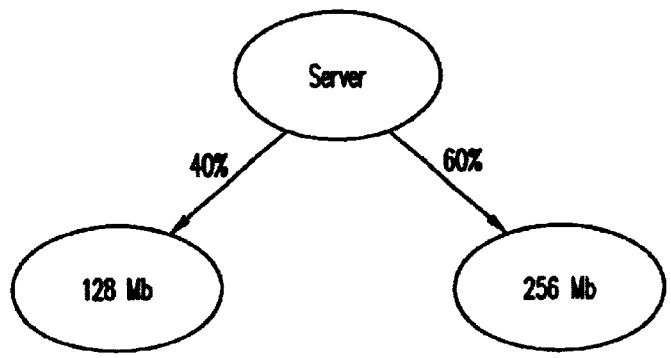
FIG. 4B illustrates an example consumption (or connect) rate for product and components.
Figure 4:
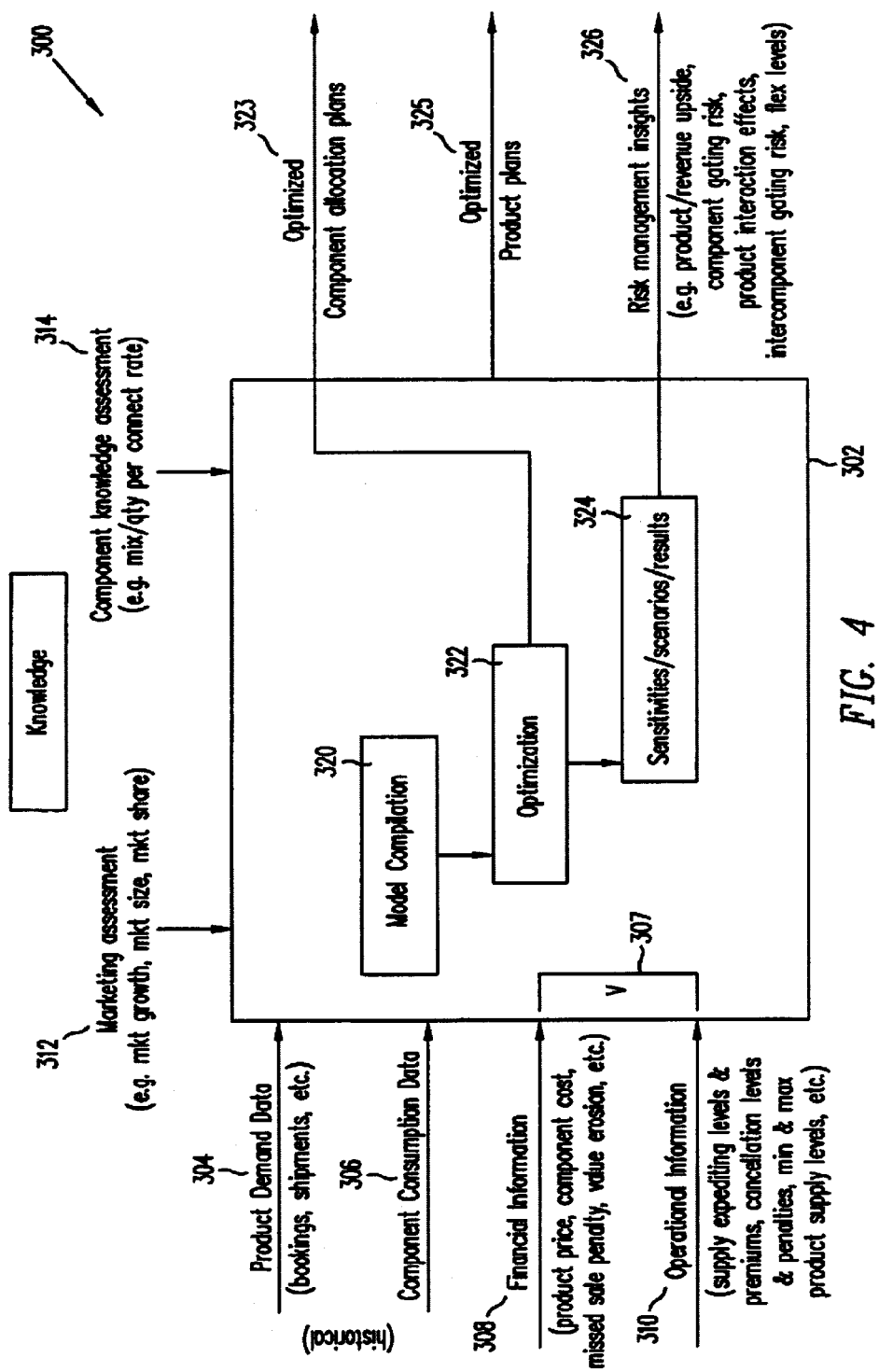
FIG. 4 shows, according to one aspect, a block diagram of certain inputs and outputs to a system which might be used for implementing the present invention.

Referring now to FIG. 4, a block diagram 300 is shown of certain representative elements that comprise the system of the present invention. This diagram shows a main element 302 with data (or information) going in, and resulting information coming out. The aggregation and treatment of such data is further detailed below. Examples of historical data flowing into the system include Product Demand Data 304, which would include bookings, shipments, etc. Historical data might also include Component Consumption Data 306.

Value information (or "V" 307) might be represented as financial or operational information. Financial information 308 would include such things as product price, component costs, missed sale penalties, value erosion, etc. A missed sale penalty is derived from every unit of product demand that is left unfulfilled. Value erosion is derived from every product that is built, but goes unsold, with its value eroding over time.

Operational information 310 might include supply expediting levels and premiums, cancellation levels and penalties, minimum and maximum product supply levels, etc. In general, there are significant costs involved with expediting the supply of a component part, particularly in times of shortage. These costs often come in the form of a penalty step function. Referring to FIG. 4A, an example step function is illustrated. The number of units is represented on the horizontal axis, and the premium is represented on the vertical axis. For the example, procuring up to 100 units carries a premium of $2 per unit. Procuring 100 to 300 units carries a premium of $4 per unit, as so forth. As more of a part is needed above a particular contract level, the greater the premium that will be paid by the manufacturer in trying to procure that part. As more of a part is needed, different trigger points will carry escalating dollar premiums. Cancellation levels and penalties relate generally to fees paid by a company for ordering certain products (or parts), and then canceling the order at a later time. The supplying company will have incurred tooling costs and the like, which must be covered in fees and penalties. Minimum and maximum product supply levels relate to supply levels being used as an operational business parameter. For instance, if a product has been deemed strategically valuable to business channels, then a minimum level might be maintained, regardless of what other financial indicators might suggest regarding the cost of maintaining such minimum levels. A distribution warehouse might carry a certain amount of a product, just in case an important customer might want to purchase a large amount of that product. The detriment of having the product as eroding inventory is outweighed by benefit of having it readily on hand for this important customer. A maximum level might be maintained in order to move customers onward to a next generation product. For instance, even if demand continues to exist for a product, the amount of inventory is fixed at a certain level. After the inventories run out, and customers want more of the product, they are instead encouraged to buy the next model in lieu of the now extinguished product.

The system shown will also incorporate knowledge, data, and the like. Such data might include marketing assessment information 312. Marketing assessment information might include market growth, market size, market share, etc. Knowledge data also includes component knowledge assessment information 314, wherein an example factor such as a mix (or quantity) per connect rate is shown. The connect rate measures the rate at which a component is "consumed" or "demanded" by a product platform. The connect rate can also be estimated from data. FIG. 4B shows a simple representative example, where the platform product is a server, and the product consumes memory at a mix rate of 40% for 128 Mb modules, and 60% for 256 Mb modules.

The main body of the system 302 shows certain representative elemental steps that utilize the various data being brought into the system. A model compilation step 320 is shown that compiles the data into a workable form so that working solutions can thereafter be derived from the modeled data. The model compilation leads into an optimization step 322. One solution might be to optimize a certain modeled component of the data, such as an expected value function representing a multivariate function. A resulting output of the system might therefore be optimized component allocation plans 323. Another related output might be optimized product plans 325. The optimization step leads into the element identified as sensitivities/scenarios/results 324. This element produces results such as risk management insights, and the like. Risk management insights 326 include such factors as product/revenue upside, component gating risk, product interaction effects, intercomponent gating risk, and flex levels. Product/revenue upside considers how such factors increase (or affect) overall revenues. Gating risks consider the effects of allocating components towards one product versus another. Interaction effects consider the influence of one product over another (in competing for resources, sales, and the like).

Flex levels consider the distance (either in revenue or in units) between the mean (or the average that is implied by a total demand), and a desired (or optimized) amount. In other words, there is an imputed level of demand from a particular model. This mean level does not necessarily indicate an optimum level. When a level is optimized, it is not necessarily at (or near) the mean, particularly if the modeled components are complex. Flex is therefore the distance between where a solution would have been, versus where the solution ends up by using the present system. The ability of the present system to define and use flex levels is advantageous over MRP type frameworks in that they do not generally allow for any uncertainty, or miss-measurement analyses. MRP frameworks tend to treat everything as deterministic, when in reality the various modeled parameters and distributions are uncertain. Flex aids in analyzing beneficial differences between existing solutions offered by the system (i.e. baseline demand) and optimized allocations using the present system.

For instance, most customers who use the present system might start out with an optimization level, or number, concerning a particular quantity to be tracked or allocated. The customer might then start layering on more strategic elements into the model, and choose to make strategic decisions regarding these various elements. Such decisions might produce results (or levels) which contradict so-called optimized levels. The present system, however, will allow the customer to quickly assess the risk involved with varying certain elements and producing a result away from an optimized norm. A decision can then be made as to what levels of product and/or components to allocate given certain business objectives, and the risks associated with using solutions which fall outside of certain baseline, optimized, or other such levels.

Figure 5:
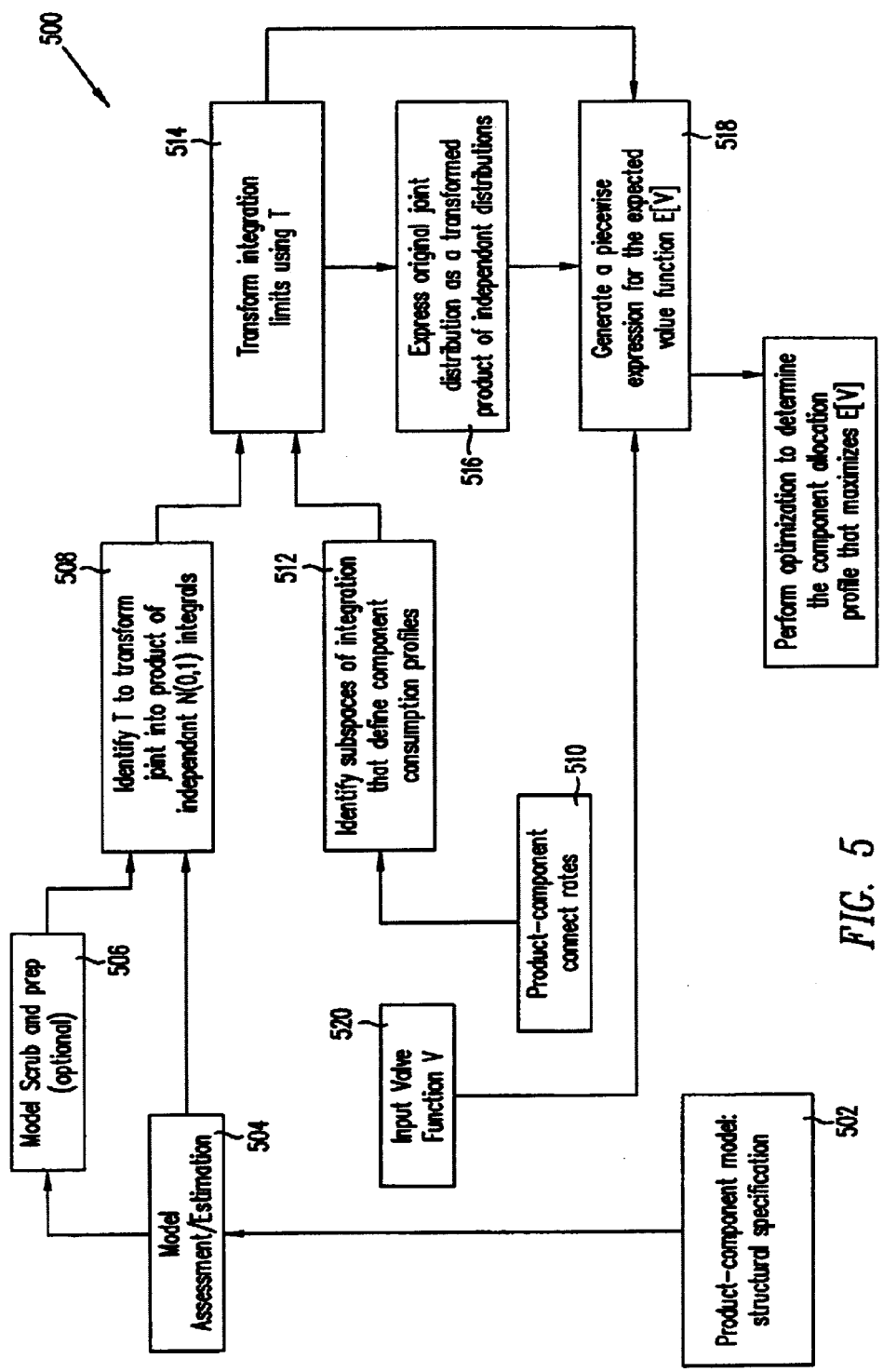
FIG. 5 illustrates, according to one aspect, a block diagram of certain representative elements used to implement the present invention.

Referring now to FIG. 5, a block diagram 500 is shown of certain representative steps which might be used according to the present solution. In step 502, the product component model (or the like) is formulated, and a structural specification is produced. In step 504, model assessment and estimation are performed, as generally derived from product demand and component consumption data. A transformation "T" is identified and used to generate a close-form, near exact expression for the expectation of a polynomial/linear/exponential function over a multivariate Guassian (or other) distribution. (See details of transformation, described in association with FIGS. 8 through 21 below). A model scrub and preparation step 506 might optionally be used. This might be used to remove redundant or irrelevant variables, and the like. The model assessment (scrubbed or not) is thereafter used by step 508 to identify the transformation T. T is used to transform the original joint distribution into a product of independent $N(0,1)$ integrals. In step 510, certain product component connect rates are fed into step 512, which identifies subspaces of integration that define component consumption profiles (see arbitrage and non-arbitrage scenarios, described in FIG. 6). The results from both steps 508 and 512 are used by step 514 to transform the integration limits using T, according to the subspaces in step 512. In step 516, the original joint distribution is expressed as a transformed product of independent distributions. In step 518, the results of steps 514 and 516 are used to generate a piecewise expression for the expected value function (as referred to as E[V], or EVF). Certain input value function parameters (e.g. price, cost, etc.) are also supplied by step 520 into step 518. Step 518 includes a decomposition step, which applies orthonormalization to determine a spanning set of orthogonal vectors that covers the space spanned by the column vectors of the original covariance matrix. The piecewise expression is further generated by transforming the subspaces of integration into new subspaces that is the intersection of the rotated, orthonormal basis vectors. Additionally, using the orthonormality of the basis vectors, the original multivariate integral is factored into a product of univariate integrals.

Figure 6:
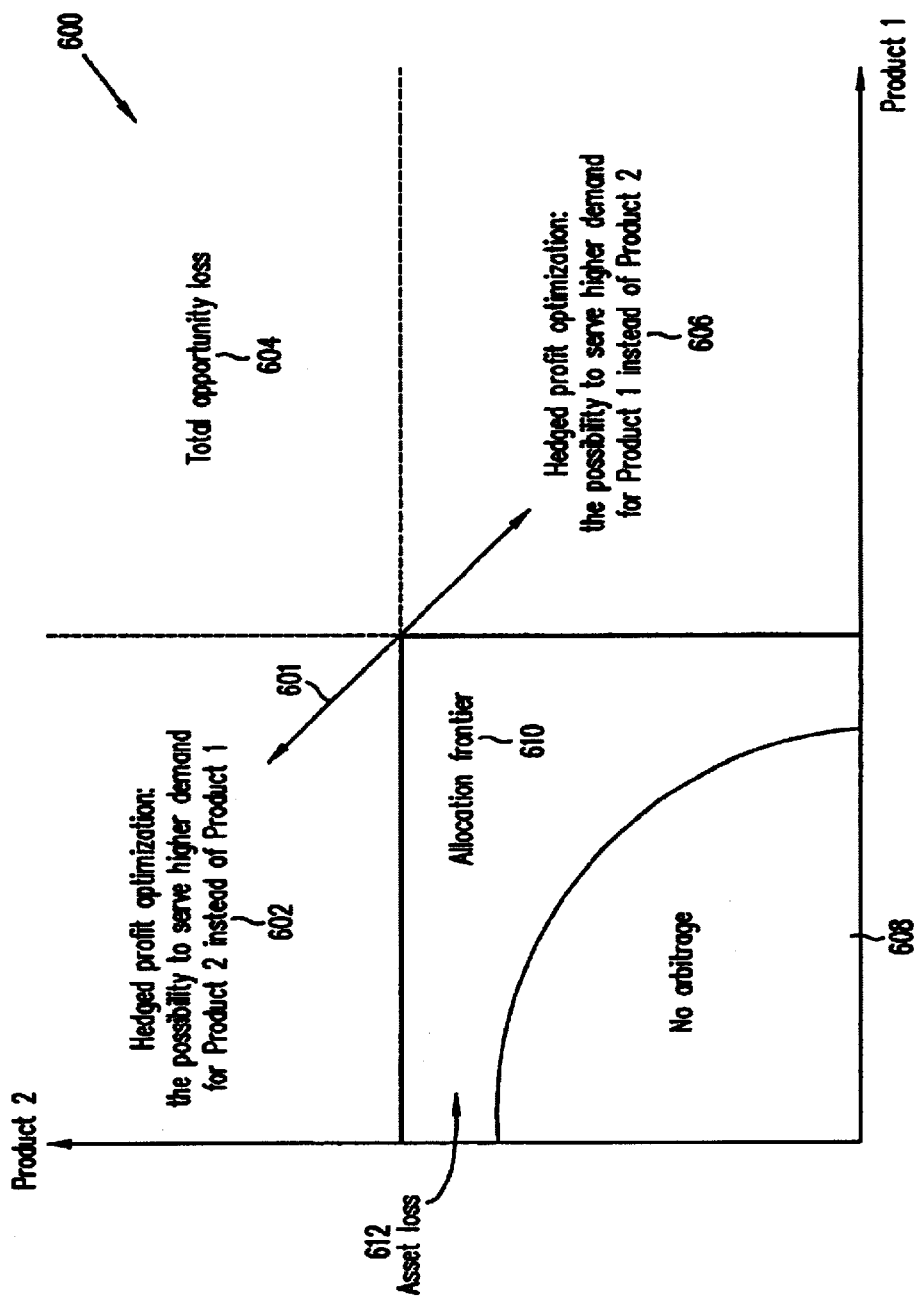
FIG. 6 is a plot, according to one aspect of the present invention, showing the concept of demand statistical arbitrage.

Referring now to FIG. 6, the concept of "demand statistical arbitrage" (DSA) is illustrated in plot 600. DSA analyzes the demand effect on a component that is shared by two products. DSA identifies a profit-optimizing, cost-minimizing allocation level for a shared component by analyzing the "demand arbitrage effect" between the two products. The term "demand arbitrage" is used to refer to the "borrowing" phenomenon by which a component supporting two different products can generate revenue on either, or potentially both, depending upon how the component is allocated and how much demand for the two products an enterprise might realize in the future. According to the illustrated product demand grid 600, two products are plotted which have an uncertain demand interaction effect. The X-axis represents the demand for Product 1, and the Y-axis represents the demand for Product 2. The products share a hard to procure, critical component with a potentially high value erosion. A set of four quadrants are formed, with the line 601 representing a transition, or limit, for the allocation of resources to form products 1 and 2. Area 608 shows the zone where no arbitrage occurs because enough resources exist to produce both Product 1 and Product 2. Area 610 represents the allocation frontier, where assets are lost (612) as decisions are made to produce more of either Product 1 or Product 2. In quadrant 602, there is hedged profit optimization, with the possibility to serve higher demand for Product 2 instead of Product 1. In quadrant 604, there is total opportunity loss. In quadrant 606, there is hedged profit optimization, with the possibility to serve higher demand for Product 1 instead of Product 2.

Figure 8:
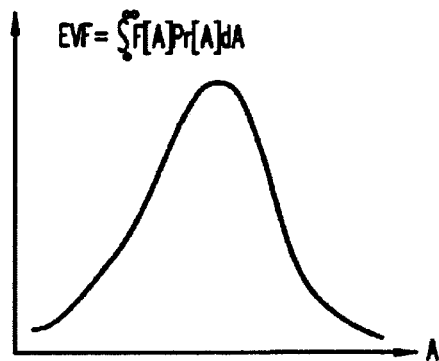
FIG. 8 shows a plot of a one dimensional representation of an expected value function.
Figure 9:
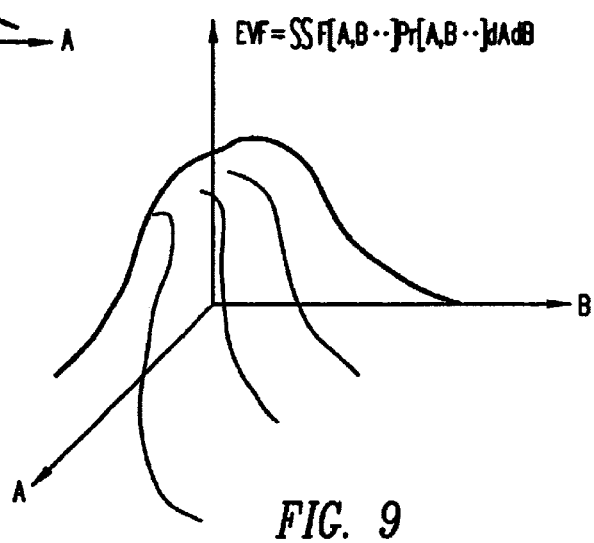
FIG. 9 shows a multi-dimensional plot of an expected value function.

Further details of the modeling, problem setup, and problem solution are described in relation to FIGS. 8 through 21. FIG. 8 shows the shape of a typical one dimensional Expected Value Function (EVF) curve, which is a combination of a function of A (F(A), i.e. linear, polynomial, or exponential), and a probability distribution of A (Pr(A), normal Guassian, or the like). FIG. 9 shows a multivariate curve over the variables A and B. As the number of variables increases, the curve becomes more and more complicated. Hence any solution, which is essentially an area under the resulting curve, is harder to solve as a series of multi-layered integrals over a set of desired limits.

Figure 10:
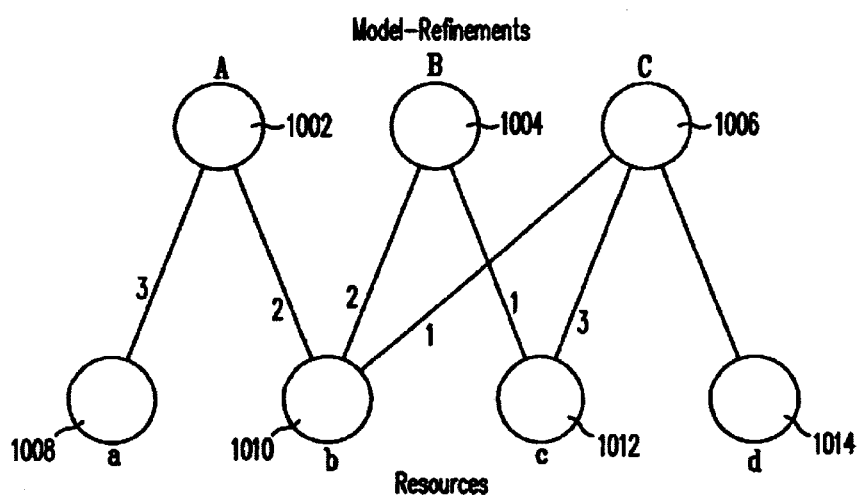
FIG. 10 shows an example consumption map between refinements and resources.

Referring now to FIG. 10, an example model 1000 is shown, as similar to the MRP diagrams above. This example model includes refinements A (1002), B (1004), and C (1006) across the top. These refinements are composed of resources "a" (1008), "b" (1010), "c" (1012), and "d" (1014) across the bottom. A consumption map is constructed, which for this example, uses nomenclature such as "#A" to represent the ratio of resources needed to manufacture one article of the refinement A. Similarly, "#B" would represent the ratio of resources needed to manufacture one article of refinement B, and so forth. The numbers beside the connecting lines show example numbers of resources needed to manufacture each refinement. Hence, the formulas:

$$\#A = \text{ratio of resources to manufacture one of } A \quad (2)$$

$$\#A \propto 3a + 2b \quad (3)$$

$$\#B \propto 2b + c \quad (5)$$

shows a linear example, wherein #A is proportional to a certain number of resources "a" added to a certain number of resources "b." Similarly, #B is proportional to a certain number of resources "b" added to a certain number of resources "c." Product consumption mapping might also be used, wherein the formulas:

$$\#A \propto a^{3/2} \cdot b^2 \quad (4)$$

$$\cap B \propto b^2 \cdot c \quad (6)$$

show that #A is proportional to "a" raised to a certain power, multiplied by "b" raised to a certain power. Similarly, #B is proportional to "b" raised to a certain power, multiplied by "c" raised to a certain power. The log of either such product formula might then be taken to again produce a function of summed elements.

Figure 11:
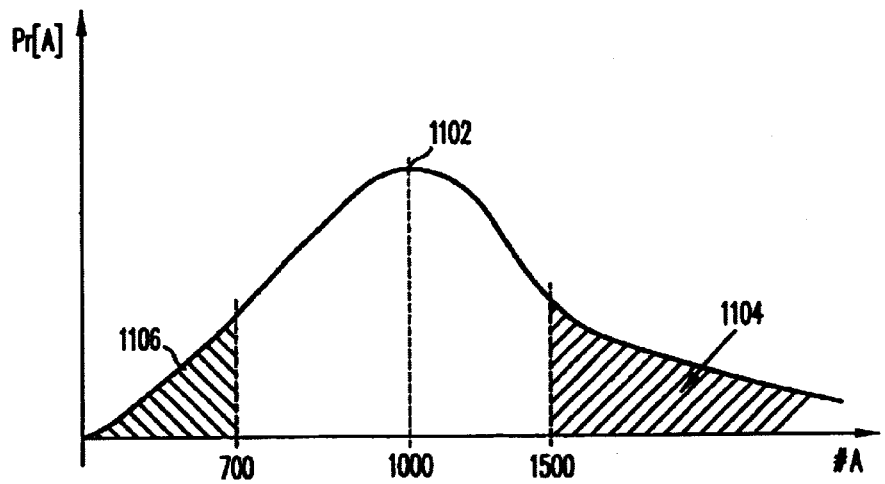
FIG. 11 shows an example one-dimensional probabilistic distribution value function and the integration of portions thereof.

The model also provides for a probability distribution for the demand of A, B, C, etc. Referring now to FIG. 11, the example probability demand is shown for the single refinement A. The mean can be calculated or derived. In this example, the mean (1102) is shown to be at #A=1000. The curve will also have a certain standard deviation. In order to determine what the demand will be for #A greater than 1500, the curve is integrated to derive the area under the curve 1104. The area is the probability of A greater than 1500. Similarly, the demand for #A less than 700 is shown by deriving (or integrating) the area under the curve as shown by 1106.

$$Pr[A,B,C, \ldots] = \text{Probability distribution demand of } A,B,C \ldots \quad (10)$$

$$Pr[\text{demand of } A > 1500] \quad (11)$$

$$Pr[\text{demand of } A < 700] \quad (12)$$

Figure 12:
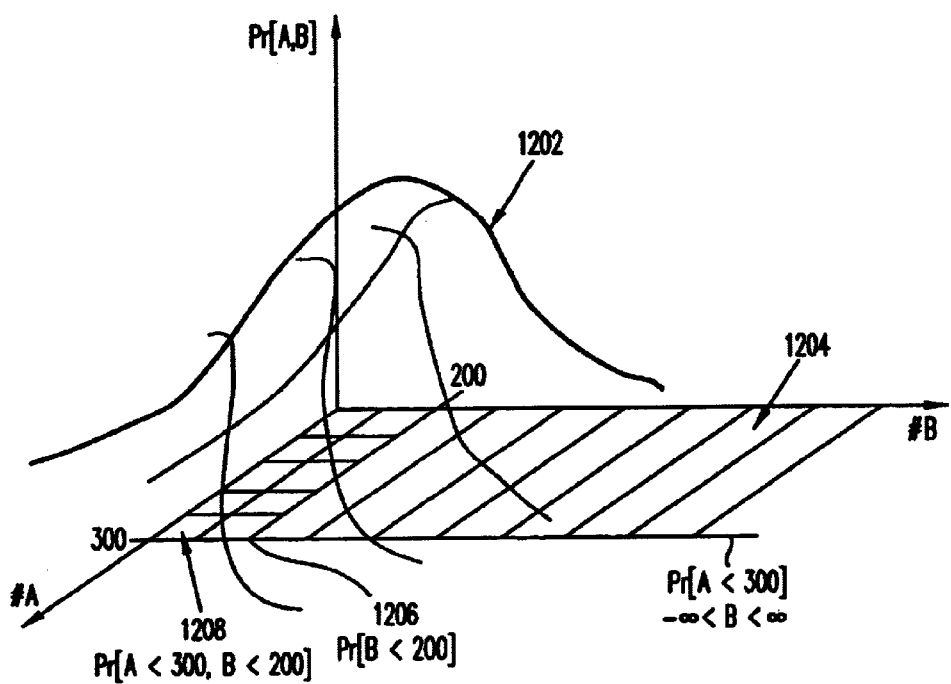
FIG. 12 shows an example two-dimensional probabilistic distribution function and the integration of portions thereof.

For more than one refinement, a multivariate (or multi-dimensional) curve is produced. FIG. 12 shows a multi-dimensional curve 1202, which represents the probability distribution of demand for refinements A and B. In order to determine the probability of A less than 300, the area under the curve 1202 is determined by integrating over the range illustrated by 1204. To find the probability of B less than 200, the curve is integrated over the range shown by 1206. The shaded area 1208 represents the combined result, i.e. Pr[A<300, B<200].

Hence, a double integration under the complex curve must be performed, as the probabilities for each refinement cannot simply be multiplied, as shown by:

$$Pr[A,B] \neq Pr[A] \cdot Pr[B] \quad (13)$$

This is true because a correlation typically exists between the refinements A and B. For instance, a positive correlation would result in a situation where if more of refinement A is sold, then more of refinement B will be sold. A negative correlation would result in a situation where if more of refinement A is sold, then less of refinement B will be sold.

$$\text{positive correlation} \rightarrow A\uparrow \rightarrow B\uparrow \quad (15)$$

$$\text{negative correlation} \rightarrow A\uparrow B\downarrow \quad (16)$$

Another component of the consumption model is that the aforementioned distribution is a multivariate normal, wherein to specify the distribution, a mean exists for A, B, and C, along with a covariance matrix, as per the following:

$$\begin{array}{c} \phantom{A}\quad A \quad B \quad C \ldots \\ \begin{array}{c} A \\ B \\ C \\ \vdots \end{array} \left[ \begin{array}{cccc} \otimes & \cdots & & \\ \vdots & \otimes & & \\ & & & \\ & & & \end{array} \right] \end{array}$$

In this matrix the elements will be the correlations between the elements, such as A and B, or A and C, etc. The correlation between A and A is the standard deviation, or the variance of A (and similarly for B and C). These numbers are computed from data relating to the model.

The uncertainty in resource allocation comes from the sharing of the various resources across one, or many, of the refinements. For an example component model, a company is interested in selling products which are produced from components. The demand distribution (i.e. for next quarter) can be derived from historical data, subjective assessments, and the like, for each of the products. To produce the products, the company must purchase a certain amount of components in order to meet these product demands.

In order to maximize revenue, the model should consider the value function of the particular company being represented. For any general flow control model, sales of products produce revenue. Expenses in procuring the resources (or components) to build the products will generally take away from the total revenue. Such expenses might include the cost of the resource, the loss in value of the resource that does not get used (or "erosion"), and/or associated expediting costs. As explained above, certain components like memory—if overstocked in inventory—depreciate at rates of up to 1% per week. On the other hand, if too little of a component is procured, then extra costs are incurred in expediting supplies of components in order to manufacture products to meet demand levels. Other costs might include penalties for late delivery, lost market share, etc.

Transformation (Solution) of Expected Value Function

In sum, the generalized problem becomes: For a given value function (i.e. for a particular model), and a given allocation of resources, what is the expected value of the value function? While applicable to any model of resource consumption, the present framework (for discussion purposes) considers a product-component (or refinement-resource) model. In particular, the problem is to find the allocation of components that maximizes value (profit, or revenue minus cost) across certain products and components. This should be done in a way that accounts for the "horizontal" interaction effects among the products, as well as the "vertical" consumption effects between the products and components.

The horizontal interaction effects are modeled as a multivariate Guassian distribution, i.e. a covariance matrix that specifically records the probabilistic interactions among the products. The vertical effects are modeled roughly as a collection of intersecting N-dimensional planes (also called hyperplanes). Each plane, in effect, defines the rate at which a single component is consumed across all products. When all the planes corresponding to a component intersect positively, then component allocation meets total product portfolio demand. When such planes intersect negatively, the component supply falls short of product portfolio demand.

The target expression to be solved (and/or optimized) is the expected value function. The expected value function is generally a multivariate integral that is hard to solve. The central step then becomes to transform the multivariate integral into a simpler form. A transformation "T" is applied which involves a "Cholesky decomposition" of the covariance matrix. The covariance matrix measures the probabilistic dependencies or interactions among all the variables. Application of the T transform has the effect of taking the problem from a space where there are many complex interactions among the products, to a space where the product demands are effectively independent of each other. Generally, according to probability theory, when two variables are independent, then the probability occurrence of both variables can be obtained by multiplying the probabilities of each variable. The probabilities of the variables in the new space can therefore be expressed as a multiplication over each of the independent product demands, which are individually called the marginal probability distribution of the demand of each product.

The multivariate integral is collapsed into a multiplication of independent integrals, which is readily solvable. However, the limits of the integrals must also be addressed. The hyperplane constraints (which form the limits) are handled by rotating the transformed planes according to a computed orthogonal basis for the planes. The orthogonal basis provides a rotation that brings out collinearities (or approximate collinearities) among the hyperplanes. The resulting approximation to the original intersection of hyperplanes allows evaluation of the product integrals. Hence, a closed-form, near exact solution is provided.

Further details regarding the summarized transformations and rotations are as follows: Referring again to FIG. 8, for any one given point on the curve, it is easy to compute a value for F[A] and/or Pr[A]. However, the expected value function becomes:

$$EVF = \int_o^\infty F[A]Pr[A]dA \qquad (1)$$

For a simple multivariate situation (i.e. A and B), a complex curve is shown as in FIG. 9. The expected value function would similarly incorporate a multivariate value function F[A, B, . . . ] and a multivariate probability function Pr[A, B, . . . ]. For each new variable added, an extra level of integration must be performed to solve the particular equation.

Solving this particular expression is rendered even more difficult in that as any particular allocation is changed, the value function is changed. The value function is multivariate, and will incorporate the addition of elements which contribute to revenues, such as "revenue A" or $r_A$ times #A, plus $r_B$ times #B, and so forth. The function will also subtract elements that take away from revenues, such as erosion of components, or costs in expediting components, and so forth. The form of the value function might be linear, polynomial, or exponential. An example of a linear function is shown by:

$$F[A] = r_A \#A + r_B \#B + \ldots - e_a(\#a \text{ left over}) \qquad (7)$$

A polynomial function is shown by:

$$F[A] = r_A \#A^2 \ldots - \exp_a(\#a \text{ expedited}) \qquad (8)$$

An exponential function is shown by:

$$F[A] = e^{rA \cdot \#A} \ldots -e^{-ea(\#a \ldots)} \qquad (9)$$

Many such models are non-elastic, and fail to account for interactive effects between, for instance, revenues and the number of products sold. The present system can be modeled to account for elastic interactions. For instance, certain complex situations might produce a situation where for more of a product sold, less revenue is derived. The revenue coefficient is therefore not a constant, but becomes a function of the number of units sold. Hence, it becomes important to model the value function in a general manner to account for interactive effects between the refinements and the resources that comprise that particular model.

Prior techniques have tried to solve the resulting multi-leveled integral, but as the formulation becomes more and more complex, the computing resources needed to solve such an equation become too expensive or unrealistic. Moreover, even if adequate computing resources are available (i.e. a supercomputer or the like), Monte Carlo techniques produce only an approximation of a solution. The present invention provides a series of transformations which can be applied to the complex integral in order to provide a closed-form expression that can be easily solved.

As a further example of the transformations applied, the model shown in FIG. 10 is reconsidered in terms of the interactions between refinements B and C, and their resource components "b" and "c." While any number of refinements might be considered, only B and C are discussed here for simplicity in illustrating the transformations. As shown "b"=2B+1C. If it is desired to always be able to produce enough of the refinements B and C, then the following must be met:

formula (20)

$$b \geq 2B + 1 \cdot C \qquad (20)$$

$$b \leq 2B + 1C \qquad (21)$$

Figure 13:
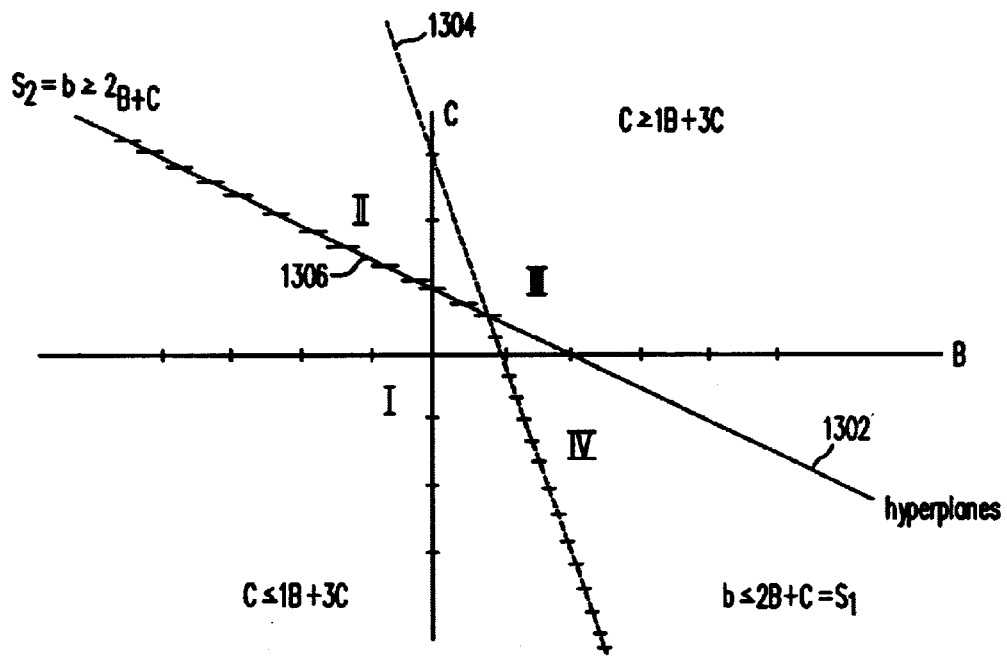
FIG. 13 shows an example plot of a first and second demand hyperplane; also shown are quadrants showing the relation between production of refinements and the usage of resources.

Referring now to FIG. 13, the axes for refinements B and C are shown. A plane 1302 is shown which represents "b"=2B+1C. The plane is hereafter referred to as a "hyperplane" which is generally a plane with one dimension less than the surrounding N-space. When below this hyperplane, there is not enough "b" support production of the refinements. Hence there is a loss of revenue, but there will be no erosion (i.e. no "b" is left over to erode). When above this hyperplane, there is enough "b." Therefore revenue will be maximized, but there will also be erosion from the unused "b." The resulting EVF will be comprised of a probability that the result is in either half of the plane, and a value function relating to that half of the plane. For example purposes, the area below the hyperplane will be referred to as S1 (or space 1) and the area above will be referred to as S2 (or space 2). The EVF then becomes:

$$EVF = \int\int_{S_1} F(S_1) Pr(S_1) \, dB \, dC + \int\int_{S_2} F(S_2) Pr(S_2) \, dB \, dc \qquad (17)$$

wherein an integration is performed over the probability that a result is in S1 times the value function for S1. This is added to an integration over the probability that a result is in S2 times the value function for S2. This example represents a single component, multiple product formulation.

To solve any multivariate problem a set of three transformations are applied. To solve this simplified single component, multiple product example, only two transformations (i.e. only the first and third transformations) are used. The first transformation involves transforming this multivariate distribution into a simpler form. Instead of using a probability distribution with multivariate normal as described above, a transformation (i.e. Cholesky decomposition) is applied wherein the result will have a covariance matrix which is diagonal, and which will have a mean of zero, as shown by:

$$covariance\ matrix\ \sum = \begin{bmatrix} 1 & & & 0 & \\ & 1 & & & \\ & & 1 & & \\ 0 & & & 1 & \\ & & & & \ddots \end{bmatrix}, M \neq 0 \qquad (18)$$

This Cholesky transformation (or reasonable modification thereof) is a linear transformation. As a result, the hyperplane 1302 is transformed into another hyperplane (given that the linear transformation of one hyperplane generally produces yet another hyperplane).

The transformation produces a similar situation wherein a hyperplane (i.e. 1401) exists in the N-space. However, this transformed result has the benefit of the distribution being centered about zero, and the distribution is also symmetric. For instance, one of the properties of the multivariate normal with a covariance unit matrix, is that it has rotational symmetry. The resulting probability distribution is now invariant under orthonormal transformations.

Figure 14:
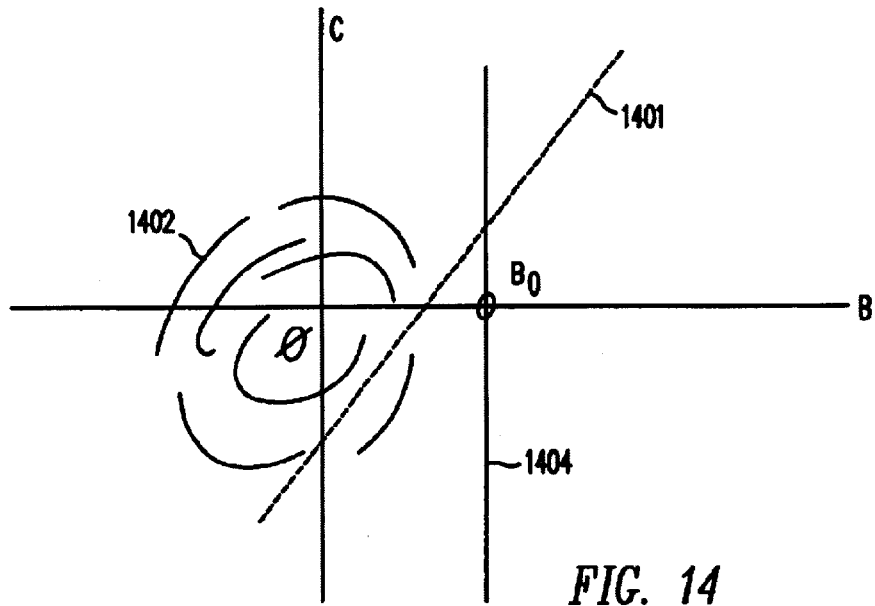
FIG. 14 shows an example plot of the demand space having been transformed (by a first and third transformation steps) to orthogonal normal with mean of zero, with the hyperplane thereafter rotated to be parallel to an axis.

Referring now to FIG. 14, a generalized representation of the distribution 1402 is shown centered about zero. This allows for the third transformation which rotates the vector space so that the new hyperplane is aligned (or perpendicular) with any one of the axes. As shown in FIG. 14, the hyperplane 1404 has been rotated to be aligned with the C axis. This second transformation does not destroy the beneficial properties of the transformed multivariate because it is invariant under orthonormal transformations. However, this transformation does change the value function, as shown by F" (double prime, or two times transformed):

$$\int_{C=-\infty}^{+\infty} \int_{B=-\infty}^{B_0} F''(B, C) Pr'[B] Pr'[C] \cdot dB \, dC \qquad (19)$$

One benefit of this new formulation is that the probabilities can now be more conveniently represented as one probability times the other probability. Additionally, the integration limits are defined as C going from +/−∞, and B going from −∞ to $B_0$, as shown by the intersection point of the hyperplane 1404 on the B axis, after rotation. This integral can now be split up into a product of integrals, which represents the desired closed-formed expression, and can readily be solved.

For a more complex example (i.e. other than the single component, multiple product example), all three transformations must be applied. Referring again to FIG. 13, a second hyperplane 1304 is shown as derived from the consumption model in FIG. 10. In this example, the hyperplane is represented by the formula "c"=1B+3C. Hence, in the regions above the hyperplane 1304, there will be enough "c" to produce the refinements B and C, as per the formula:

$$c \geq 1B + 3C \qquad (22)$$

In the regions below the hyperplane 1304, there will not be enough "c" to produce the refinements B and C, according to the formula:

$$c \leq 1B + 3C \qquad (24)$$

The addition of this second hyperplane (and subsequently more hyperplanes in more complex examples) leads to the formation of polytopes, as shown by the hashed line 1306. In the area below this hashed line, for example, there will not be enough "b" or "c" to support the manufacture of refinements B and C. The intersection of these two hyperplanes thereby produces four regions pertaining to the consumption model. In region I, there is not enough of "b" and "c" to the support the demand for B and C, and there will be erosion on both "b" and "c". In region II, there is enough "b", but not "c", with erosion on "b" and revenue losses. In region III, there is enough "b" and "c" to support the demand for B and C, with erosion on both. In region IV, there is enough "c" but not "b", with erosion on "c" and revenue losses. As each new variable is added, a new hyperplane is added, and the polytope becomes more complex, with more of such quadrants.

As relating again to the transformations, the first transformation step (i.e. Cholesky decomposition) rotates both hyperplanes to a new position in the N-space. Though the rotations are linear, the hyperplanes do not get rotated together. Hence, their final positions could be in any orientation, and they will intersect in a different manner than how may have originally intersected. The second transformation therefore pulls out a subset of the hyperplanes, and then rotates the subset so that they are orthogonal. Referring now to FIG. 15, the subset hyperplanes 1502 and 1504 are shown rotated into such an orthogonal position. This transformation step is based upon theories and applications of factor analysis of space. This transformation might sometimes reduce the number of hyperplanes, as a function the final spatial dimensions applied, and whether the planes have been rotated to be parallel, or nearly parallel. In some instances, it is beneficial to reduce the number of planes (if possible), particularly for high dimensionality problems.

Referring now to FIG. 16, the third transformation step is applied (as similar to before) and the intersecting orthogonal planes are rotated to be parallel with the respective axes. In this instance, each hyperplane is parallel with one of the axes. This transformation is based upon orthonormal Lie group theoretic transformations. Related boundaries (or limits) for the associated integrals can be derived from the orthogonal (parallel) planes.

The transformations allow the final (transformed) mathematical expression to be broken down in a product and sum of single dimensional integrals, with known boundaries, which can be readily solved. This represents a closed-form expression that can be implemented and solved for any set of input parameters using readily available computer resources, or the like (i.e. a supercomputer is not needed).

Sensitivity Analysis

Given that a closed form solution results from the present invention, sensitivity analysis can be readily performed on any given problem. As the function is shown below:

$$EVF = f(a,b,c,r_A,e_A \ldots) \quad (25)$$

the expected value function is a closed form expression of a series of variables, i.e. a, b, c, etc. If the user desires to solve the function for a series of values, such values need only be plugged into the function and solved, as per the example formula:

$$EVF = f(a=10, b=1, c=2, r_A=5, e_A=10 \ldots) \quad (26)$$

Sensitivity analysis might then be performed by varying any one of the variables by a certain "delta" amount, and then recalculating the result. For instance:

$$r_A \rightarrow r_A + \delta r_A \quad (27)$$

shows the revenue for refinement A being increased by a delta amount. This might result in an increase (or decrease) in the final revenue, and the different results can be weighed against each other in light of other business concerns and constraints (which might exist—for consideration—completely outside the present model).

Given that this is a closed-form solution, derivatives over a certain variable can also be calculated. For example:

$$\frac{\partial EVF}{\partial r_A} \quad (28)$$

shows a derivative of the expected value function over the revenue for refinement A. Referring to FIG. 18, if the curve 1802 is as shown, then by finding $f(x0)$ and $f(x1)$, the derivative can be computed as the slope 1804 along this curve.

However, referring now to FIG. 17, a typical Monte Carlo (or approximation) result 1702 is shown. This noisy approach will produce a result that is relatively uncertain, in light of the "real" curve, which is shown as 1704. Hence by computing $f(x0)$ and $f(x1)$, the derivative will incorrectly be indicated as the slope 1706 as shown between these two points.

The precise solution of the present invention will allow convenient computations pertaining to the allocation of resources, and the like. For instance, a company might desire to have enough inventory of components to support the manufacture of all their products, to within two standard deviations, or at a 95% percentile, or the like. Given that these products are shared, and inter-correlated in most cases, one component might run out, and cause erosion on other components. Other components might be gating, with others are not. Another company might be interested in the probability of erosion, etc. Trying to bound and solve any such set of such interrelated parameters is extremely cumbersome without the solution offered by the present invention.

In practice, the present invention can implement a closed-form solution in a fraction of the amount of code that it might take to try and solve the multi-level integral presented by the prior art. Moreover, different functions can be individually implemented and called upon in a "workbench" type environment. Specific problems might be quickly solved with such independent (or specialized) functions. Moreover, certain functions might be compiled into a composite function to perform more complex tasks.

Hardware Configuration

Figure 7:
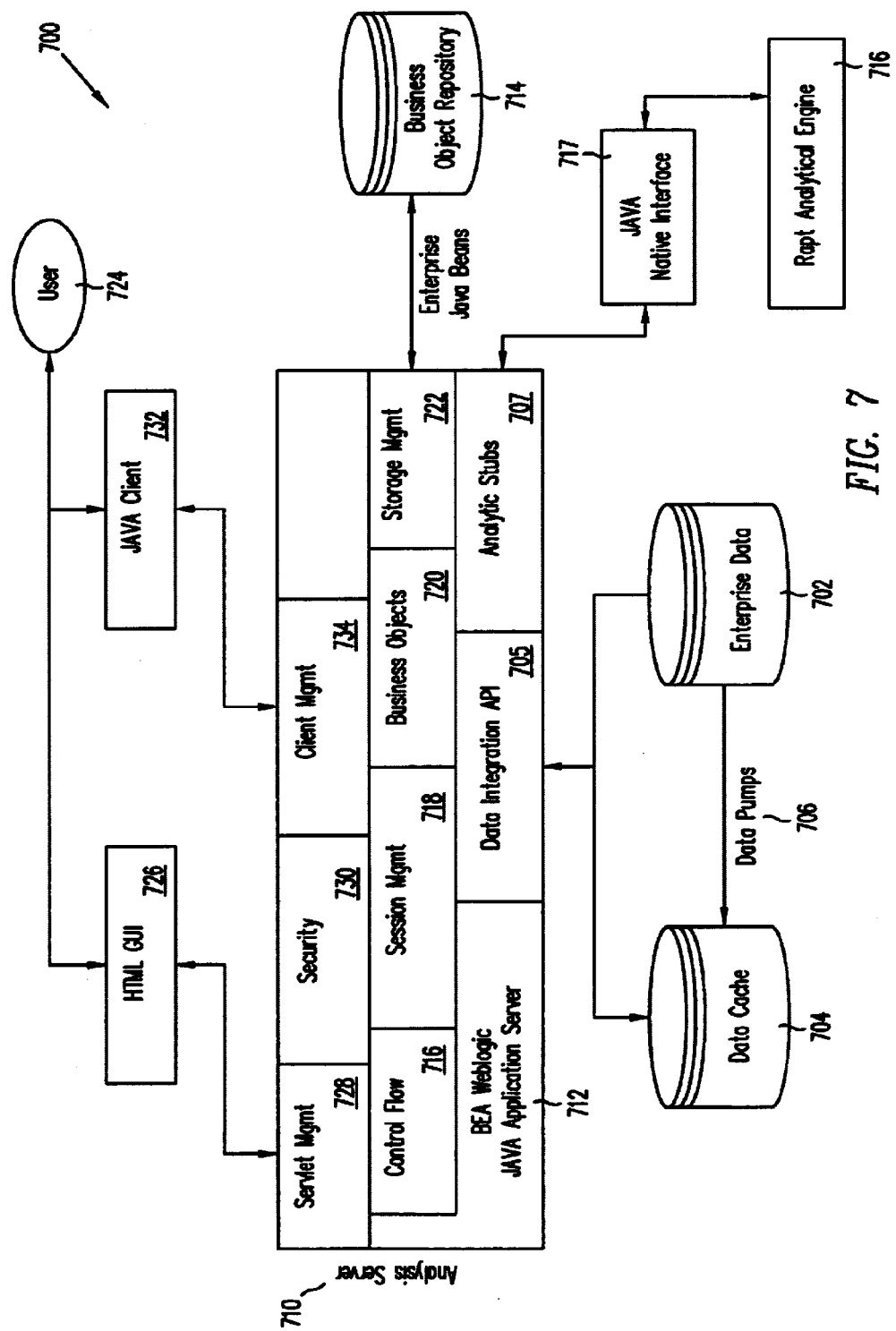
FIG. 7 is a block diagram, according to one aspect of the present invention, showing certain representative hardware elements which might be used to implement the present invention.

Referring now to FIG. 7, a block diagram 700 is shown of certain representative architecture elements which might be used to implement the present invention. This is an example configuration, and is not meant to be limited to this particular structure or arrangement. Enterprise data is shown stored in a database 702. Enterprise data would include such things a product demand, component consumption, and building material information. Enterprise data can provide for such relational aspects, such as which components are configurable inside certain products. A data cache 704 utilizes data pumps 706 from the enterprise data. The data cache is used to organize and speed up the flow of data. A data integration API 705 is used to handle the throughput of data from the server 710. The data is used by the analysis server 710, which is a collection of component technologies, some of which are custom developed, and others of which are integrated from other providers. For instance, the Weblogic (or Java) application server 712 might come from BEA. This device manages communication between the client's application and back-end data sources. It can manage application entities like multiple servers accessing the server line for information, or the like. It can also manage multi-tasking (and/or multi-threading), and generally control flow 716, and session management 718.

A business object repository 714 is shown and is used to store artifacts that the users manage in the application. The business objects 720 are shown interacting with the repository through a storage management interface 722. Certain concepts have been created to aid the user in navigating through the environment. Items such as user plans are referred to as a scenario, and a scenario is used to record and store such elements as user assessments about demand, price, cost, financial and operational information, supply, expediting, and the like. A scenario is stored in the business object repository 714. The interchange can be done using Enterprise Java Beans (EJB) or the like. EJB is a standard offered by Sun Microsystems for creating and managing Java based objects on a server. Any standard open system specification might similarly be used, and perhaps implemented as a plug-and-play type system.

The analytic engine 716 represents a set of analytic routines that perform the modeling, estimation, and optimization (if needed) for the given system. The engine is drawn as a separate box, and in fact might exist on a separate computer platform. In the preferred embodiment, the engine is implemented on the same computer as the server elements. A standard Java Native Interface 717 provides protocol between the engine and all of the Java oriented objects in the server. Analytic stubs 707 might be used as an interface with the server 710. On the other hand, such interactions might be implemented solely with HTML (Hypertext Mark-up Language), or a similarly capable language. Accordingly, a user 724 is shown which might interact with the server 710 via an HTML GUI (Graphical User Interface) 726 and a servlet management module 728. A security module (or device) 730 is used to manage access to the server 710. The user 724 might also interact with the server via a Java client interface 732, and a client management module 734.

Sensors

Figure 19:
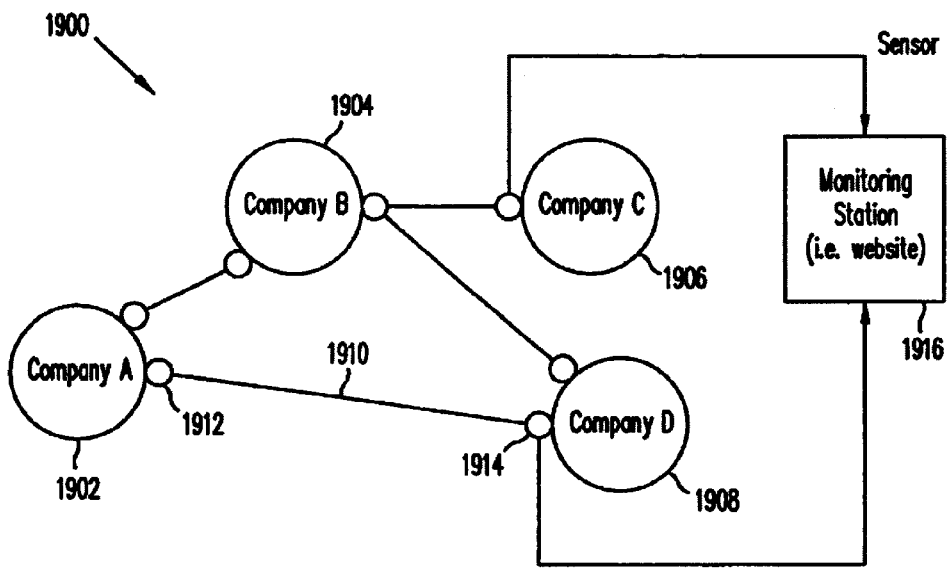
FIG. 19 shows, according to another aspect of the present invention, a configuration for including sensor elements in the data communication paths between entities.

Still another embodiment of the present invention might use a form (or embodiment) of a "sensor" placed at strategic points along the data flows between companies (or other entities). The sensor will be used to dynamically update and formulate the modeled system. The sensor is essentially a configurable software (and/or hardware, and/or firmware) agent that measures and monitors the performance of an uncertain variable by continually updating and evaluating an embedded (or associated) probabilistic (or other type) model. Referring now to FIG. 19, a representative block diagram 1900 is shown of certain sensors being used for collecting such data. A configuration of example companies A, B, C, and D, (1902–1908) are shown communicating with each other via data connections such as 1910 (e.g. Internet, hardwires, wireless, etc.). Sensor 1912 and 1914 are shown placed at either end of the data connection 1910. As company A (1902) communicates with company D (1908) regarding orders and shipments of products and/or components, the sensor continually samples and tests this data. A probabilistic model (or any other model) might be embedded within the sensor. This probabilistic model interacts with the user (i.e. the company) through continual updating and monitoring of that model against the data. A monitoring station 1916 is shown which can be used to monitor and/or configure the sensor model. A convenient form of the monitoring station would include a website. Each sensor could then access that website from any remote location and provide any such data needed to dynamically update the sensor.

Figure 20:
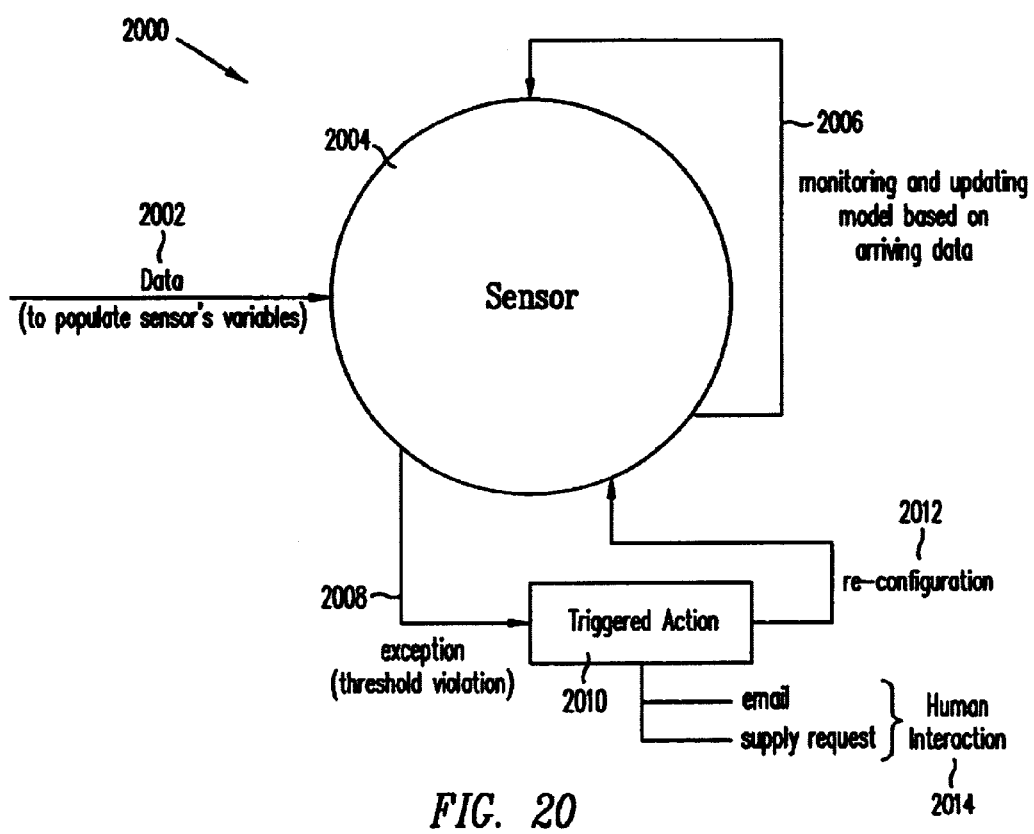
FIG. 20 shows, according to another aspect of the present invention, an example sensor and how it handles certain data.

Referring now to FIG. 20, a block diagram 2000 is shown of an example sensor model with certain representative elements. Data 2002 flows into the sensor 2004 to populate the sensor's variables. A feedback loop 2006 is shown whereby the sensor monitors and updates an embedded (or associated) model based upon the arriving data. Certain exceptions (e.g. threshold violations, etc.) 2008 might prompt a triggered action 2010. A re-configuration (or the like) 2012 might thereafter be sent back to the sensor as a result of the exception. The triggered action can also be used to illicit human interaction 2014. Such interaction might come in the form of an email message, a supply request, or the like.

Figure 21:
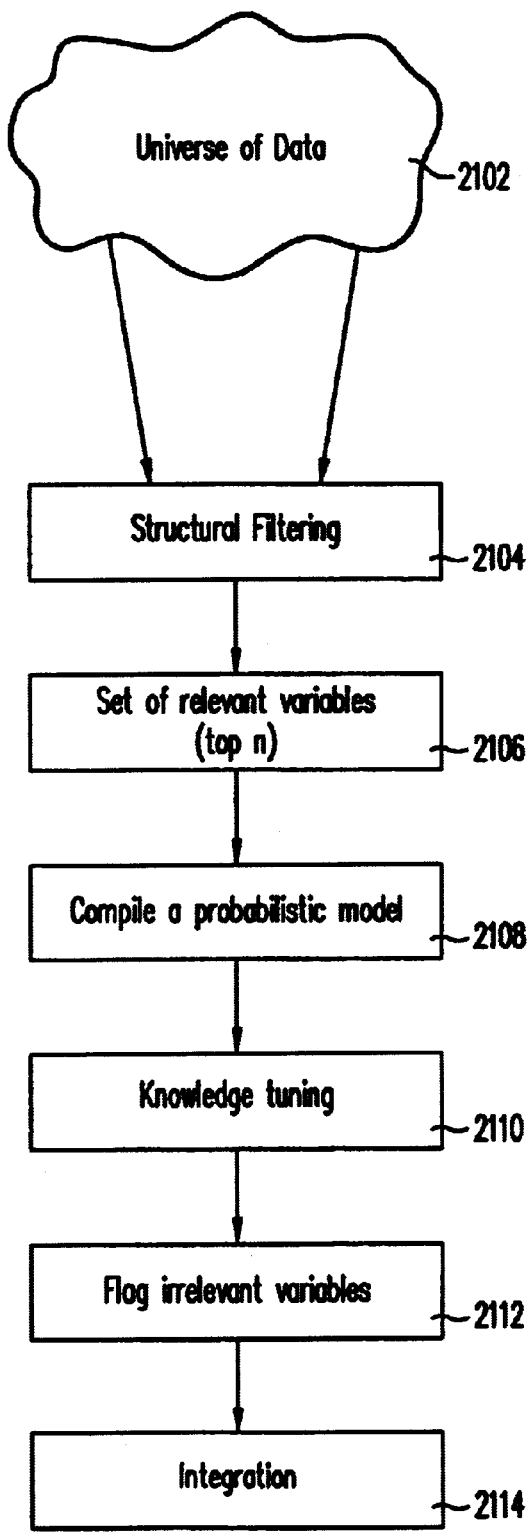
FIG. 21 shows, according to yet another aspect of the present invention, a flowchart of certain representative steps used in association with a sensor configuration.

Referring now to FIG. 21, a flow chart 2100 is shown of certain representative steps that might be used in association with the aforementioned sensors. The sensors might be used in many different modes of interaction. For instance, the sensors might be used to configure a model, or for inspection of data along the data paths. A universe of data 2102 is shown feeding a structural filtering step 2104. Such structural filters would be used, for instance, to identify variables that go furthest in "explaining" the uncertainty in the particular variable of interest (e.g. cost, ASP, product revenue performance, etc.). Step 2106 next shows a set of relevant variables (i.e. the top, or most relevant "n"). This set has been winnowed down from a larger set of variables. In step 2108, a probabilistic model is compiled. This would involve a parametric "fitting" or instantiation of a model that links the relevant variables to the variable of interest. Knowledge tuning is next performed in step 2110. This step generally involves letting a human user layer on domain knowledge. For instance, the domain experts can identify relevant signal variables that also help explain uncertainty in the quantity of interest. In step 2112, certain variables are sampled/tested by the user and irrelevant variables are flagged. Thereafter, in step 2114 the remaining user variables are integrated into a pre- compiled probabilistic model.

Computer System Embodiment

Figure 22:
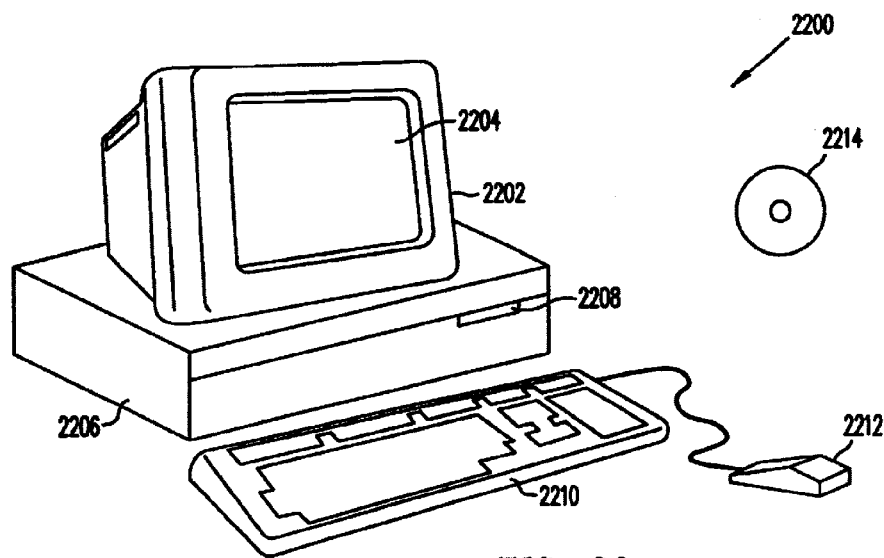
FIGS. 22 and 23 illustrate a computer system suitable for implementing embodiments of the present invention.
Figure 23:
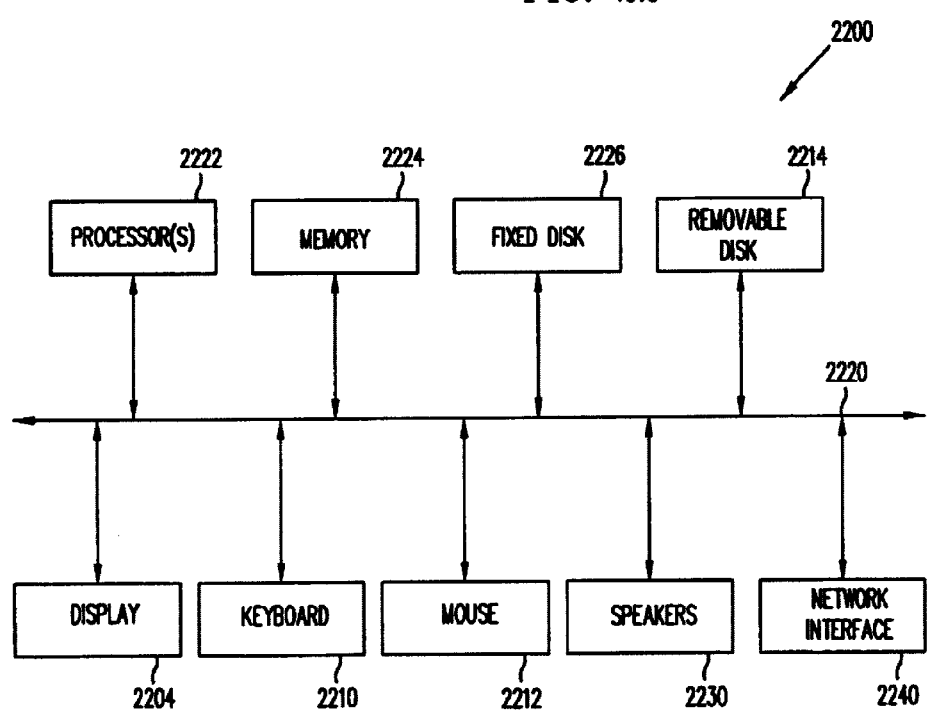

FIGS. 22 and 23 illustrate a computer system 2200 suitable for implementing embodiments of the present invention. FIG. 22 shows one possible physical form of the computer system. Of course, the computer system may have many physical forms ranging from an integrated circuit, a printed circuit board and a small handheld device up to a huge super computer. Computer system 2200 includes a monitor 2202, a display 2204, a housing 2206, a disk drive 2208, a keyboard 2210 and a mouse 2212. Disk 2214 is a computer-readable medium used to transfer data to and from computer system 2200.

FIG. 23 is an example of a block diagram for computer system 2200. Attached to system bus 2220 are a wide variety of subsystems. Processor(s) 2222 (also referred to as central processing units, or CPUs) are coupled to storage devices including memory 2224. Memory 2224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 2226 is also coupled bi-directionally to CPU 2222; it provides additional data storage capacity and may also include any of the computer-readable media described below. Fixed disk 2226 may be used to store programs, data and the like and is typically a secondary storage medium (such as a hard disk) that is slower than primary storage. It will be appreciated that the information retained within fixed disk 2226, may, in appropriate cases, be incorporated in standard fashion as virtual memory in memory 2224. Removable disk 2214 may take the form of any of the computer-readable media described below.

CPU 2222 is also coupled to a variety of input/output devices such as display 2204, keyboard 2210, mouse 2212 and speakers 2230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 2222 optionally may be coupled to another computer or telecommunications network using network interface 2240. With such a network interface, it is contemplated that the CPU might receive information from the network, or might output information to the network in the course of performing the above-described method steps. Furthermore, method embodiments of the present invention may execute solely upon CPU 2222 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. An automated method for allocating a set of resources, comprising:

modeling the relationship between the set of resources and a set of refinements as a value function, wherein
the set of resources are used in producing the set of refinements,
each resource of the set of resources has a resource level, and
the value function is one of a linear expression of the set of refinements, a polynomial expression of the set of refinements, and an exponential expression of the set of refinements;

providing for an expected value function to be solved which is a statistical expectation of the value function at a given resource allocation, and for a given demand distribution of the set of refinements, wherein
the demand distribution is an elliptically contoured distribution;
electronically computing the statistical expectation of the value function over a subspace of demands, wherein
the demands are satisfied by the resource levels given the relationships between the set of resources and the set of refinements,
resource consumption is based upon a relationship between each refinement of the set of refinements and a set of supporting resources of the set of resources, and
the set of supporting resources corresponds to each refinement;
transforming the expected value function into a closed form expression; and
allocating the set of resources using the expected value function.

2. The method of claim 1, further comprising:

diagonalizing the covariance matrix of the distribution; and reducing the subspace to a polytope, wherein
the polytope is defined by the intersection of mutually orthogonal halfspaces,
each halfspace is orthogonal to a coordinate axis, and
the diagonalizing and the reducing are performed jointly and simultaneously.

3. The method of claim 2, wherein the relationship between the each refinement and the set of supporting resources is a linear relationship, and the modeling provides for at least the demand distribution of the set of refinements, and
the value function, wherein
each resource, and the refinements that the each resource supports, generates a resource hyperplane in a demand space having coordinate axes for the refinements, and the complete set of refinements generates an intersecting set of hyperplanes in the demand space such that the intersection of hyperplanes forms a polytype on which resource allocation fulfills refinement demand.

4. The method of claim 3, wherein a first step used in transforming the expected value function into a closed form expression includes:

performing an affine transformation of the demand distribution which reduces the mean and covariance matrix of the refinement demand into a multivariate normal distribution that has a zero mean, and an identity covariance matrix, and is invariant to orthonormal transformations, wherein
the corresponding resource hyperplanes are transformed into new hyperplanes.

5. The method of claim 4, wherein the linear transformation is a form of Cholesky decomposition.

6. The method of claim 4, wherein a subsequent step of transforming the expected value function into a closed form expression includes:

identifying a minimum orthogonal set of hyperplanes that spans the preceding transformed hyperplanes.

7. The method of claim 6, wherein a form of factor analysis is used to identify the minimum spanning set.

8. The method of claim 6, wherein the final step of transforming the expected value function into a closed form expression includes:
rotating orthogonally the minimum spanning set of hyperplanes so that the minimum spanning set of hyperplanes align along the coordinate axes of the demand space, and wherein the value function is similarly transformed upon rotation about the coordinate axes.

9. The method of claim 3, wherein the value function is a revenue function for certain refinements.

10. The method of claim 9, wherein the revenue function is expressed as a sum of the products of at least the margin and demand for each refinement.

11. The method of claim 2, wherein the expected value function is factored into a sum of products of univariate integrals, each with a closed form solution.

12. The method of claim 2, wherein the closed form expression is used to compute flex level by computing a solution with certain parameter values, and then recomputing the solution with the parameters having delta levels away from the original values.

13. The method of claim 2, wherein the step of transforming the expected value function into a closed form expression allows for nonlinear elasticity in the value function.

14. The method of claim 2, wherein the value function comprises arguments that are up to quadratic in nature.

15. The method of claim 2, wherein the demand distribution is a multivariate normal distribution.

16. The method of claim 2, further comprising:
analyzing a sensitivity of the value function to changes in at least one of
the resource levels,
the relationship, and
a mean and a covariance of the demand distribution.

17. An apparatus configured to perform the method of claim 2, comprising:
a first input device, wherein the first input device is configured to receive the value function,
a second input device, wherein the second input device is configured to receive the resource levels, and
a third input device, wherein the third input device is configured to receive information regarding the relationship.

18. The method of claim 2, wherein each of the resource levels is an input.

19. The method of claim 18, wherein each input is a quantity.

20. The method of claim 1, wherein the transforming is performed using a transformation "T".

21. An apparatus for allocating a set of resources, comprising:
a modeling device configured to derive the relationship between the set of resources and a set of refinements as a value function, wherein
the set of resources are used in producing the set of refinements,
each resource of the set of resources has a resource level, and
the value function is one of a linear expression of the set of refinements, a polynomial expression of the set of refinements, and an exponential expression of the set of refinements;
a formulation device configured to derive an expected value function to be solved which is a statistical expectation of the value function at a given resource allocation, and for a given demand distribution of the set of refinements, wherein
the demand distribution is an elliptically contoured distribution;
a computing device configured to compute the statistical expectation of the value function over a subspace of demands, wherein
the demands are satisfied by the resource levels given the relationship between the set of resources and the set of refinements,
resource consumption is based upon a relationship between each refinement of the set of refinements and a set of supporting resources of the set of resources, and
the set of supporting resources corresponds to the each refinement;
a transformation device configured to transform the expected value function into a closed form expression, wherein the set of resources can be allocated using the expected value function.

22. The apparatus according to claim 21, wherein the modeling device provides for at least,
resource consumption as based upon the linear relationship between each refinement and its set of supporting resources,
a demand distribution of the refinements, and
a value function,
wherein each resource, and the refinements that is supports, generates a resource hyperplane in a demand space having coordinate axes for the refinements, and the complete set of refinements generates an intersecting set of hyperplanes in the demand space such that the intersection of hyperplanes forms a polytope on which resource allocation fulfills refinement demand.

23. The apparatus according to claim 22, wherein the transformation device performs at least a first step in transforming the expected value function into a closed form expression, the step comprising:
performing a linear transformation of the multivariate covariance matrix of the refinement demand distribution which reduces the mean and covariance matrix of the refinement demand into a multivariate normal distribution that has a zero mean, and an identity covariance matrix, and is invariant to orthonormal transformations,
wherein the corresponding resource hyperplanes are transformed into new hyperplanes which are clustered into groups that are approximately parallel.

24. The apparatus according to claim 23, wherein the transformation device performs at least a subsequent step in transforming the expected value function into a closed form expression, the step comprising:
identifying a minimum orthogonal set of hyperplanes that spans the preceding transformed hyperplanes.

25. The apparatus according to claim 24, wherein the transformation device performs at least a final step in transforming the expected value function into a closed form expression, the step comprising:
rotating orthogonally the minimum spanning set of hyperplanes so that they align along the coordinate axes of the demand space, and wherein the value function is similarly transformed upon rotation about the coordinate axes.

26. The apparatus of claim 21, wherein the transformation device is configured to perform a transformation "T".

* * * * *